United States Patent
Shariff et al.

(10) Patent No.: US 10,346,887 B1
(45) Date of Patent: Jul. 9, 2019

(54) METHOD, APPARATUS, AND COMPUTER PROGRAM PRODUCT FOR CALCULATING A PROVIDER QUALITY SCORE

(71) Applicant: Groupon, Inc., Chicago, IL (US)

(72) Inventors: Shafiq Shariff, Chicago, IL (US); Matt Deland, San Francisco, CA (US); Bob Beaty, Chicago, IL (US); Derek Nordquist, Chicago, IL (US)

(73) Assignee: GROUPON, INC., Chicago, IL (US)

(*) Notice: Subject to any disclaimer, the term of this patent is extended or adjusted under 35 U.S.C. 154(b) by 263 days.

(21) Appl. No.: 13/826,866

(22) Filed: Mar. 14, 2013

Related U.S. Application Data

(60) Provisional application No. 61/730,046, filed on Nov. 26, 2012, provisional application No. 61/709,623, filed on Oct. 4, 2012.

(51) Int. Cl.
*G06Q 30/02* (2012.01)

(52) U.S. Cl.
CPC ................................ *G06Q 30/0282* (2013.01)

(58) Field of Classification Search
None
See application file for complete search history.

(56) References Cited

U.S. PATENT DOCUMENTS

| | | |
|---|---|---|
| 6,058,371 A | 5/2000 | Djian |
| 6,922,672 B1 | 7/2005 | Hailpern et al. |
| 7,092,929 B1 | 8/2006 | Dvorak et al. |
| 7,240,025 B2 | 7/2007 | Stone et al. |
| 7,647,255 B2 | 1/2010 | Wang et al. |
| 7,720,708 B1 | 5/2010 | Elkins, II et al. |
| 7,769,628 B2 | 8/2010 | Mathews et al. |
| 7,917,387 B2 | 3/2011 | Spurr et al. |
| 8,001,058 B1 * | 8/2011 | Harding ............. G06Q 10/087 705/347 |
| 8,010,404 B1 | 8/2011 | Wu et al. |
| 8,019,744 B1 | 9/2011 | Roizen et al. |
| 8,200,521 B2 | 6/2012 | Hader |
| 8,214,238 B1 | 7/2012 | Fairfield et al. |
| 8,249,942 B2 | 8/2012 | Mesaros |
| 8,478,650 B2 | 7/2013 | Ridley et al. |
| 8,533,038 B2 | 9/2013 | Bergh et al. |
| 8,600,843 B2 | 12/2013 | Bachman et al. |
| 8,725,597 B2 * | 5/2014 | Mauseth ............. G06Q 10/10 705/28 |
| 2001/0032128 A1 | 10/2001 | Kepecs |
| 2001/0039514 A1 | 11/2001 | Barenbaum et al. |

(Continued)

OTHER PUBLICATIONS

U.S. Appl. No. 61/639,067, filed Apr. 26, 2012; entitled *Deal Meter*.

(Continued)

*Primary Examiner* — Andrew B Whitaker
(74) *Attorney, Agent, or Firm* — Alston & Bird LLP

(57) ABSTRACT

Provided herein are systems, methods and computer readable media for assigning, calculating or determining a provider quality score. An example method comprises capturing metric information from a web source, the metric information indicative of a product, service, or experience performance of a provider. For example each of a number of reviews and the total number of reviews may be captured. The method may further comprise assigning a provider quality score.

35 Claims, 7 Drawing Sheets

(56) References Cited

U.S. PATENT DOCUMENTS

| | | |
|---|---|---|
| 2002/0042739 A1 | 4/2002 | Srinivasan et al. |
| 2002/0052820 A1 | 5/2002 | Gatto |
| 2002/0099678 A1 | 7/2002 | Albright et al. |
| 2002/0169654 A1 | 11/2002 | Santos et al. |
| 2002/0198756 A1 | 12/2002 | Ghaisas et al. |
| 2003/0046191 A1 | 3/2003 | Ferreri et al. |
| 2003/0065603 A1 | 4/2003 | Aihara et al. |
| 2003/0220830 A1 | 11/2003 | Myr |
| 2004/0093296 A1 | 5/2004 | Phelan et al. |
| 2004/0143473 A1 | 7/2004 | Tivey et al. |
| 2005/0055275 A1 | 3/2005 | Newman et al. |
| 2005/0060242 A1 | 3/2005 | Armstrong et al. |
| 2005/0096963 A1 | 5/2005 | Myr et al. |
| 2005/0187818 A1 | 8/2005 | Zito et al. |
| 2005/0261951 A1 | 11/2005 | Tighe |
| 2005/0267828 A1 | 12/2005 | Baron et al. |
| 2006/0041500 A1 | 2/2006 | Diana et al. |
| 2006/0047559 A1 | 3/2006 | Jacoby et al. |
| 2006/0161534 A1 | 7/2006 | Carson, Jr. et al. |
| 2006/0212355 A1 | 9/2006 | Teague et al. |
| 2006/0287946 A1 | 12/2006 | Toms |
| 2007/0016508 A1 | 1/2007 | Lapointe et al. |
| 2007/0050276 A1 | 3/2007 | Mannion |
| 2007/0087831 A1 | 4/2007 | Van Luchene et al. |
| 2007/0168131 A1 | 7/2007 | Root et al. |
| 2008/0021844 A1 | 1/2008 | Sanwal et al. |
| 2008/0177615 A1 | 7/2008 | Chen-Ritzo et al. |
| 2008/0256061 A1 | 10/2008 | Chang et al. |
| 2008/0270209 A1* | 10/2008 | Mauseth .......... G06Q 10/10 705/7.29 |
| 2008/0281756 A1 | 11/2008 | Riise et al. |
| 2008/0288481 A1 | 11/2008 | Zeng et al. |
| 2008/0294996 A1 | 11/2008 | Hunt et al. |
| 2008/0306812 A1 | 12/2008 | Bowen et al. |
| 2008/0313018 A1 | 12/2008 | Kamm, IV et al. |
| 2009/0024402 A1* | 1/2009 | Delingat .......... G06Q 30/04 705/310 |
| 2009/0048859 A1 | 2/2009 | McCarthy et al. |
| 2009/0119258 A1* | 5/2009 | Petty .......... G06Q 30/02 |
| 2009/0177540 A1 | 7/2009 | Quatse |
| 2009/0276296 A1 | 11/2009 | Spriegel |
| 2009/0281818 A1 | 11/2009 | Li et al. |
| 2010/0050201 A1 | 2/2010 | Kubota et al. |
| 2010/0082410 A1 | 4/2010 | Baudin et al. |
| 2010/0082413 A1 | 4/2010 | Huberman et al. |
| 2010/0082442 A1 | 4/2010 | Ma et al. |
| 2010/0094693 A1 | 4/2010 | Corke |
| 2010/0179704 A1 | 7/2010 | Ozog |
| 2010/0211455 A1 | 8/2010 | Williams et al. |
| 2011/0029382 A1 | 2/2011 | Narasimhan et al. |
| 2011/0087531 A1 | 4/2011 | Winters et al. |
| 2011/0112892 A1 | 5/2011 | Tarantino |
| 2011/0112897 A1 | 5/2011 | Tietzen et al. |
| 2011/0173059 A1 | 7/2011 | Benson |
| 2011/0219073 A1* | 9/2011 | Lawler .......... G06F 15/16 709/204 |
| 2011/0225023 A1 | 9/2011 | Evens et al. |
| 2011/0231321 A1 | 9/2011 | Milne |
| 2011/0246255 A1 | 10/2011 | Gilbert et al. |
| 2011/0246260 A1 | 10/2011 | Gilbert et al. |
| 2011/0246306 A1 | 10/2011 | Okabe et al. |
| 2011/0258067 A1* | 10/2011 | Rowell .......... G06Q 30/06 705/26.2 |
| 2011/0289106 A1 | 11/2011 | O'Brien |
| 2011/0313840 A1 | 12/2011 | Stolte |
| 2012/0010931 A1 | 1/2012 | Modani |
| 2012/0036009 A1 | 2/2012 | Aronowich |
| 2012/0054001 A1 | 3/2012 | Zivkovic et al. |
| 2012/0054019 A1 | 3/2012 | Powter |
| 2012/0054020 A1 | 3/2012 | Jacobs |
| 2012/0066393 A1 | 3/2012 | Tekwani |
| 2012/0078721 A1 | 3/2012 | Dakka et al. |
| 2012/0123851 A1 | 5/2012 | Bax et al. |
| 2012/0123863 A1 | 5/2012 | Kaul et al. |
| 2012/0203708 A1* | 8/2012 | Psota .......... G06Q 30/02 705/347 |
| 2012/0246015 A1 | 9/2012 | Bennett et al. |
| 2012/0259705 A1 | 10/2012 | Monteverde |
| 2012/0271660 A1 | 10/2012 | Harris et al. |
| 2012/0278154 A1 | 11/2012 | Lange et al. |
| 2012/0291087 A1* | 11/2012 | Agrawal .......... G06F 21/55 726/1 |
| 2012/0323634 A1 | 12/2012 | Oksman |
| 2012/0330720 A1 | 12/2012 | Pickton et al. |
| 2012/0330772 A1 | 12/2012 | Choe et al. |
| 2013/0006916 A1 | 1/2013 | McBride et al. |
| 2013/0013345 A1 | 1/2013 | Wallquist et al. |
| 2013/0013404 A1 | 1/2013 | Suprock et al. |
| 2013/0030872 A1 | 1/2013 | Oksman |
| 2013/0036069 A1* | 2/2013 | Salloum .......... G06Q 10/103 705/347 |
| 2013/0054369 A1 | 2/2013 | Grigg et al. |
| 2013/0066885 A1* | 3/2013 | Komuves .......... G06Q 10/10 707/748 |
| 2013/0073381 A1 | 3/2013 | Binkley |
| 2013/0080239 A1 | 3/2013 | Okerlund |
| 2013/0103634 A1* | 4/2013 | Jojic .......... G06Q 30/02 706/52 |
| 2013/0159319 A1* | 6/2013 | Duan .......... G06F 16/954 707/748 |
| 2013/0179264 A1 | 7/2013 | Wilson |
| 2013/0185147 A1 | 7/2013 | Letca et al. |
| 2013/0197675 A1 | 8/2013 | McCarthy et al. |
| 2013/0246176 A1* | 9/2013 | Chang .......... G06Q 30/0204 705/14.53 |
| 2013/0282509 A1 | 10/2013 | Strong et al. |
| 2013/0290172 A1 | 10/2013 | Mashinsky |
| 2013/0311271 A1 | 11/2013 | Agrawal et al. |
| 2013/0346157 A1 | 12/2013 | Avrilionis et al. |
| 2013/0346981 A1 | 12/2013 | Johnson et al. |
| 2014/0019249 A1 | 1/2014 | Nicholas et al. |
| 2014/0025467 A1 | 1/2014 | Nagarajan et al. |
| 2014/0143100 A1 | 5/2014 | Glustrom et al. |
| 2014/0279058 A1 | 9/2014 | Mullins et al. |
| 2015/0149091 A1 | 5/2015 | Milton et al. |
| 2016/0314399 A1 | 10/2016 | Mullins et al. |

OTHER PUBLICATIONS

U.S. Appl. No. 61/682,762, filed Aug. 13, 2012; entitled *Unified Payment and Return on Investment System*.

U.S. Appl. No. 13/411,502, filed Mar. 2, 2012; entitled *Relevance System for Consumer Deals*.

U.S. Appl. No. 13/460,745, filed Apr. 30, 2012, entitled *Sales Enhancement System*.

U.S. Appl. No. 13/842,379, filed Mar. 15, 2013 entitled *Pull-Type Searching System*.

U.S. Appl. No. 14/038,629, filed Sep. 26, 2013; entitled *Automated Deal Guide Structure Identification*.

U.S. Appl. No. 14/039,473, filed Sep. 27, 2013, entitled *Method, Apparatus, and Computer Program Product for Consumer Tracking*.

U.S. Appl. No. 14/106,203, filed Dec. 13, 2013, entitled *Method, Apparatus, and Computer Program Product for Providing a Search Feedback System*.

U.S. Appl. No. 13/829,581, filed Mar. 14, 2013; In re: Richardson et al., entitled *Updating Routing Information Based on Client Location*.

Office Action from U.S. Appl. No. 13/803,275, dated Apr. 7, 2015.

Office Action from U.S. Appl. No. 13/826,757, dated Apr. 10, 2015.

"Credit Rating Analysis with Support Vector Machines and Neural Networks: A Market Comparative Study"; Zan Huanga, Hsinchun Chena, Chia-Jung Hsua, Wun-Hwa Chenb, Soushan Wu; 0167-9236/03/$—see front matter 2003 Elsevier B.V. All rights reserved. doi:10.1016/S0167-9236(03)00086-1.

"Support Vector Machine for Regresssion and Applications to Financial Forecasting"; Theodore B. Trafalig and Huseyin Ince; 0-7695-0619-4/00 $10.00 2000 IEEE.

(56) References Cited

OTHER PUBLICATIONS

"Forecasting Corporate Revenue and Profit: Time-Series Models Versus Management and Analysts"; David A. Kodde and Hein Schreuder; Journal of Business Finance & Accounting; 11(3), Autumn 1984, 0306686x$2.50.
Office Action from U.S. Appl. No. 13/826,464, dated Apr. 7, 2015.
Office Action from U.S. Appl. No. 13/826,333, dated Apr. 21, 2015.
Office Action from U.S. Appl. No. 13/803,445, dated Jun. 5, 2015.
Office Action from U.S. Appl. No. 13/803,445, dated Nov. 6, 2015.
Office Action from U.S. Appl. No. 13/805,000, dated Nov. 6, 2015.
Office Action from U.S. Appl. No. 13/803,275, dated Nov. 3, 2015.
Notice of Allowance for corresponding U.S. Appl. No. 13/826,757 dated Dec. 30, 2015.
Office Action from U.S. Appl. No. 14/316,228, dated Feb. 1, 2016.
Office Action for U.S. Appl. No. 13/826,333 dated Aug. 9, 2016.
Office Action for U.S. Appl. No. 14/316,264 dated Jul. 28, 2016.
Office Action for U.S. Appl. No. 14/316,253 dated Jul. 29, 2016.
Office Action for U.S. Appl. No. 13/803,445 dated Oct. 7, 2016.
Office Action for U.S. Appl. No. 13/805,000 dated Oct. 7, 2016.
Office Action for U.S. Appl. No. 14/316,228 dated Oct. 12, 2016.
Advisory Action for U.S. Appl. No. 14/316,228 dated May 23, 2016.
Office Action for U.S. Appl. No. 13/826,464 dated Jun. 23, 2016.
Office Action from U.S. Appl. No. 13/805,000, dated Jun. 6, 2015.
Office Action from U.S. Appl. No. 14/316,228, dated Jul. 16, 2015.
Office Action from U.S. Appl. No. 13/826,333, dated Aug. 13, 2015.
Office Action from U.S. Appl. No. 13/826,464, dated Aug. 31, 2015.
Office Action from U.S. Appl. No. 13/826,757, dated Sep. 29, 2015.
Advisory Action for U.S. Appl. No. 13/826,333 dated Nov. 27, 2015.
Office Action for U.S. Appl. No. 15/051,165 dated Aug. 31, 2016.
Office Action for U.S. Appl. No. 13/826,464 dated Nov. 21, 2016.
Wong, W., "Andrew Mason talks about Groupon's growth and growing up", Chicago Tribune, Business, (Sep. 8, 2012), pp. 1-3, Retrieved oniine at: http://articles.chicagotribune.com/2012-09-08/business/chi-andrew-mason-talks-about-groupons-growth-and-growing-up-20120908_1_deal-personalization-groupons-core-daily-deal-business.
International Search Report and Written Opinion for Application No. PCT/US2014/44067 dated Nov. 14, 2014.
International Search Report and Written Opinion for Application No. PCT/US2014/020028 dated Jun. 6, 2014.
Extended European Search Report for European Office Application No. 14818658.8 dated Dec. 9, 2016, 5 pages.
U.S. Appl. No. 13/803,445, filed Mar. 14, 2013; In re: Shariff et al., In re: Method, Apparatus, and Computer Program Product for Sales Pipeline Automation.
"CMPT 125: Lecture 1: Understanding the Computer" Tamara Smyth School of Computing Science, Simon Fraser University Jan. 3, 2009.

\* cited by examiner

METHOD, APPARATUS, AND COMPUTER PROGRAM PRODUCT FOR CALCULATING A PROVIDER QUALITY SCORE

CROSS REFERENCES TO RELATED APPLICATIONS

This application claims priority to U.S. Provisional Patent Application No. 61/730,046, titled "METHOD AND APPARATUS FOR MATCHING SUBSCRIBER DEMAND WITH MERCHANT/INVENTORY SUPPLY" filed on Nov. 26, 2012", and U.S. Provisional Application No. 61/709,623, titled "MERCHANT SIDE CROSS-CATEGORY DEAL DIVERSITY", filed Oct. 4, 2012, each of which is hereby incorporated by reference.

The present application is related to U.S. patent application Ser. No. 13/803,445, filed Mar. 14, 2013, titled "METHOD, APPARATUS, AND COMPUTER PROGRAM PRODUCT FOR SALES PIPELINE AUTOMATION", U.S. patent application Ser. No. 13/826,333, filed Mar. 14, 2013, titled "METHOD, APPARATUS, AND COMPUTER PROGRAM PRODUCT FOR DEMAND FORECASTING", U.S. patent application Ser. No. 13/805,000, filed Mar. 14, 2013, titled "METHOD, APPARATUS, AND COMPUTER PROGRAM PRODUCT FOR IDENTIFICATION OF SUPPLY SOURCES", U.S. patent application Ser. No. 13/826,464, filed Mar. 14, 2013, titled "METHOD, APPARATUS, AND COMPUTER PROGRAM PRODUCT FOR LEAD ASSIGNMENT", U.S. patent application Ser. No. 13/826,757, filed Mar. 14, 2013, titled "METHOD, APPARATUS, AND COMPUTER PROGRAM PRODUCT FOR DETERMINING A PROVIDER RETURN RATE", U.S. patent application Ser. No. 13/804,403, filed Mar. 14, 2013, titled "METHOD, APPARATUS, AND COMPUTER PROGRAM PRODUCT FOR IDENTIFYING A SERVICE NEED VIA A PROMOTIONAL SYSTEM", U.S. patent application Ser. No. 13/804,316, filed Mar. 14, 2013, titled "METHOD, APPARATUS, AND COMPUTER PROGRAM PRODUCT FOR DETERMINING CLOSING METRICS", and U.S. patent application Ser. No. 13/830,243, filed Mar. 14, 2013, titled "CAPACITY CALCULATOR", and U.S. patent application Ser. No. 13/803,275, filed Mar. 14, 2013, titled "MERCHANT SIDE CROSS-CATEGORY DEAL DIVERSITY" each of which is hereby incorporated by reference.

FIELD

Embodiments of the invention relate, generally, to assigning, calculating, or determining a provider quality score.

BACKGROUND

The internet has transformed the way people communicate. Many websites exist for supplying both objective information of a provider of a good, service or experience, but also for allowing users to populate subjective information, such as reviews or likes. With the amount of websites providing such information, Applicant has discovered problems with current methods of using such information to determine with which providers of goods, service, and/or experiences, they should engage in a business relationship. Through applied effort, ingenuity, and innovation, Applicant has solved the identified problems by developing a solution that is embodied by the present invention, which is described in detail below.

BRIEF SUMMARY

In general, embodiments of the present invention provided herein include systems, methods and computer readable media for calculating a provider quality score.

In one embodiment of the present invention, a method is provided including capturing one or more metrics relating to a provider, wherein the one or more metrics are indicative of a third parties evaluation of at least one of a product, service or experience provided by the provider, a performance of a provider, or the provider itself, capturing a number indicative of a quantity of the one or more captured metrics, and calculating a provider quality score based on the one or more metrics and the number indicative of a quantity of the one or more captured metrics, wherein the provider score provides an indication of future provider performance and future third party reaction to the provider.

In another embodiment, the metrics are review information, and the method further may comprise calculating an average review score based on the one or more metrics and the number indicative of a quantity of metrics. In another embodiment, the method may further comprise detecting one or more web sources related to provider information, and determining whether the one or more web sources provide metrics related to the provider. In another embodiment, the method may further comprise detecting a provider website, rating a quality of the provider website, and factoring the quality of the provider website into the provider quality score calculation. In another embodiment, the method may further comprise accessing prior performance data, wherein prior performance data comprises one or more of data related to a previous provider promotion, data related to a previous promotion promoted by a related provider, or data related to a previous promotion promoted by a different promotion service by the provider, and factoring the prior performance data into the provider quality score calculation.

In another embodiment, the method may further comprise capturing positive press review information related to a provider, determining if the positive press review information is from an acceptable source, and factoring the positive press review information into the provider quality score calculation. In another embodiment, the method may further comprise capturing a number of "likes" related to a provider from one or more web sources, and factoring in the number of "likes" into the provider quality score application.

In another embodiment, the method may further comprise in an instance in which the average review score is greater than a first predetermined threshold, and the number of reviews is greater than a second predetermined threshold, performing a first quality analysis. In another embodiment, the method may further comprise in an instance in which the average review score is less than the first predetermined threshold, or the number of reviews is less than the second predetermined threshold, performing a second quality analysis.

In another embodiment, the first quality analysis comprises in an instance in which the average review score is greater than a third predetermined threshold and in an instance in which the number of reviews is greater than a fourth predetermined threshold, performing a third quality analysis. In another embodiment, the third quality analysis comprises determining whether the provider is associated with a positive press review, in an instance in which the provider is associated with a positive press review, assigning a first provider quality score.

In another embodiment, the third quality analysis comprises determining whether the provider is associated with a positive press review, in an instance in which the provider is not associated with a positive press review, assigning a second provider quality score. In another embodiment, the first quality analysis comprises in an instance in which the average review score is less than a third predetermined threshold or in an instance in which the number of reviews is less than a fourth predetermined threshold, performing a fourth quality analysis.

In another embodiment, the fourth quality analysis comprises in an instance in which the average review score is at least than a fifth predetermined threshold and in an instance in which the number of reviews is at least a sixth predetermined threshold, assigning a third provider quality score. In another embodiment, in an instance in which the average review score is less than the fifth predetermined threshold or in an instance in which the number of reviews is less than a sixth predetermined threshold, the method may further comprise determining a number of "likes". In another embodiment, the method may further in an instance in which the average review score is at least the fifth predetermined threshold and in an instance in which the number of "likes" is at least a seventh predetermined threshold, assigning a fourth provider quality score.

In another embodiment, the method may further comprise in an instance in which the average review score is less than the fifth predetermined threshold or in an instance in which the number of "likes" is less than the seventh predetermined threshold, assigning a fifth provider quality score. In another embodiment, the second quality analysis comprises in an instance in which the average review score is less than an eighth predetermined threshold or in an instance in which the number of reviews is less than a tenth predetermined threshold, assigning a tenth provider quality score. In another embodiment, the method may further comprise in an instance in which the average review score is greater than an eighth predetermined threshold and in an instance in which the number of reviews is greater than a tenth predetermined threshold, performing a fifth quality analysis. In another embodiment, the fifth quality analysis comprises in an instance in which the average review score is less than a ninth predetermined threshold, assigning an ninth provider quality score. In another embodiment, the fifth quality analysis comprises in an instance in which the average review score is greater than a ninth predetermined threshold, performing a sixth quality analysis. In another embodiment, the sixth quality analysis comprises capturing a number of "likes" from one or more web sources, and determining whether the provider is associated with a positive press review from one or more web sources.

In another embodiment, the method may further comprise in an instance in which the provider is not associated with a positive press review or in an instance in which the number of likes is less than an eleventh predetermined threshold, assigning an eighth provider quality score. In another embodiment, the method may further comprise in an instance in which the provider is associated with a positive press review, and in an instance in which the number of likes is greater than an eleventh predetermined threshold, performing a seventh quality analysis. In another embodiment, the seventh quality analysis comprises in an instance in which the average review score is greater than a twelfth predetermined threshold and in an instance in which the number of "likes" is greater than a thirteenth predetermined threshold, assigning a sixth provider quality score.

In another embodiment, the seventh quality analysis comprises in an instance in which the average review score is less than a twelfth predetermined threshold or in an instance in which the number of "likes" is less than a thirteenth predetermined threshold, assigning a seventh provider quality score. In another embodiment, the method may further comprise determining whether a provider is associated with an online presence, and in an instance where the provider is not associated with an online presence, assigning a minimum provider quality score.

In another embodiment of the present invention, an apparatus is provided. The apparatus may comprise at least one processor and at least one memory including computer program code, the at least one memory and the computer program code configured to, with the at least one processor, cause the apparatus at least to capture one or more metrics relating to a provider, wherein the one or more metrics are indicative of a third parties evaluation of at least one of a product, service or experience provided by the provider, a performance of a provider, or the provider itself, capture a number indicative of a quantity of the one or more captured metrics, and calculate a provider quality score based on the one or more metrics and the number indicative of a quantity of the one or more captured metrics, wherein the provider score provides an indication of future provider performance and future third party reaction to the provider.

In another embodiment, the metrics are review information, wherein the at least one memory and computer program code are configured to, with the at least one processor, cause the apparatus to calculate an average review score based on the one or more metrics and the number indicative of a quantity of metrics. In another embodiment, the at least one memory and computer program code are configured to, with the at least one processor, cause the apparatus to detect one or more web sources related to provider information, and determine whether the one or more web sources provide metrics related to the provider.

In another embodiment, the at least one memory and computer program code are configured to, with the at least one processor, cause the apparatus to detect a provider website, rate a quality of the provider website, and factor the quality of the provider website into the provider quality score calculation. In another embodiment, the at least one memory and computer program code are configured to, with the at least one processor, cause the apparatus to access prior performance data, wherein prior performance data comprises one or more of data related to a previous provider promotion, data related to a previous promotion promoted by a related provider, or data related to a previous promotion promoted by a different promotion service by the provider, and factor the prior performance data into the provider quality score calculation.

In another embodiment the at least one memory and computer program code are configured to, with the at least one processor, cause the apparatus to capture positive press review information related to a provider, determine if the positive press review information is from an acceptable source, and factor the positive press review information into the provider quality score calculation. In another embodiment, the at least one memory and computer program code are configured to, with the at least one processor, cause the apparatus to capture a number of "likes" related to a provider from one or more web sources, and factor in the number of "likes" into the provider quality score application. In another embodiment, the at least one memory and computer program code are configured to, with the at least one processor, cause the apparatus to in an instance in which the average review score is greater than a first predetermined threshold, and the number of reviews is greater than a second predetermined threshold, perform a first quality analysis.

In another embodiment, the at least one memory and computer program code are configured to, with the at least one processor, cause the apparatus to in an instance in which the average review score is less than the first predetermined threshold, or the number of reviews is less than the second predetermined threshold, perform a second quality analysis. In another embodiment, the first quality analysis comprises in an instance in which the average review score is greater than a third predetermined threshold and in an instance in which the number of reviews is greater than a fourth predetermined threshold, performing a third quality analysis.

In another embodiment, the third quality analysis comprises determining whether the provider is associated with a positive press review, in an instance in which the provider is associated with a positive press review, assigning a first provider quality score. In another embodiment, the third quality analysis comprises determining whether the provider is associated with a positive press review, in an instance in which the provider is not associated with a positive press review, assigning a second provider quality score. In another embodiment, the first quality analysis comprises in an instance in which the average review score is less than a third predetermined threshold or in an instance in which the number of reviews is less than a fourth predetermined threshold, performing a fourth quality analysis. In another embodiment, the fourth quality analysis comprises in an instance in which the average review score is at least than a fifth predetermined threshold and in an instance in which the number of reviews is at least a sixth predetermined threshold, assigning a third provider quality score.

In another embodiment, in an instance in which the average review score is less than the fifth predetermined threshold or in an instance in which the number of reviews is less than a sixth predetermined threshold, the at least one memory and computer program code are configured to, with the at least one processor, cause the apparatus to determine a number of "likes". In another embodiment, in an instance in which the average review score is at least the fifth predetermined threshold and in an instance in which the number of "likes" is at least a seventh predetermined threshold, the at least one memory and computer program code are configured to, with the at least one processor, cause the apparatus to assign a fourth provider quality score. In another embodiment, in an instance in which the average review score is less than the fifth predetermined threshold or in an instance in which the number of "likes" is less than the seventh predetermined threshold, the at least one memory and computer program code are configured to, with the at least one processor, cause the apparatus to assign a fifth provider quality score.

In another embodiment, the second quality analysis comprises in an instance in which the average review score is less than an eighth predetermined threshold or in an instance in which the number of reviews is less than a tenth predetermined threshold, assigning a tenth provider quality score. In another embodiment, in an instance in which the average review score is greater than an eighth predetermined threshold and in an instance in which the number of reviews is greater than a tenth predetermined threshold, the at least one memory and computer program code are configured to, with the at least one processor, cause the apparatus to perform a fifth quality analysis. In another embodiment the fifth quality analysis comprises in an instance in which the average review score is less than a ninth predetermined threshold, assigning an ninth provider quality score. In another embodiment, the fifth quality analysis comprises in an instance in which the average review score is greater than a ninth predetermined threshold, performing a sixth quality analysis. In another embodiment the sixth quality analysis comprises capturing a number of "likes" from one or more web sources, and determining whether the provider is associated with a positive press review from one or more web sources.

In another embodiment, in an instance in which the provider is not associated with a positive press review or in an instance in which the number of likes is less than an eleventh predetermined threshold, the at least one memory and computer program code are configured to, with the at least one processor, cause the apparatus to assign an eighth provider quality score. In another embodiment, in an instance in which the provider is associated with a positive press review, and in an instance in which the number of likes is greater than an eleventh predetermined threshold, wherein the at least one memory and computer program code are configured to, with the at least one processor, cause the apparatus to perform a seventh quality analysis. In another embodiment, the seventh quality analysis comprises in an instance in which the average review score is greater than a twelfth predetermined threshold and in an instance in which the number of "likes" is greater than a thirteenth predetermined threshold, assigning a sixth provider quality score. In another embodiment, the seventh quality analysis comprises in an instance in which the average review score is less than a twelfth predetermined threshold or in an instance in which the number of "likes" is less than a thirteenth predetermined threshold, assigning a seventh provider quality score. In another embodiment, the at least one memory and computer program code are configured to, with the at least one processor, cause the apparatus to determine whether a provider is associated with an online presence, and in an instance where the provider is not associated with an online presence, assigning a minimum provider quality score.

In another embodiment of the present invention, a computer program product is provided. The computer program product may comprise at least one computer-readable storage medium having computer-executable program code instructions stored therein, the computer-executable program code instructions comprising program code instructions for capturing one or more metrics relating to a provider, wherein the one or more metrics are indicative of a third parties evaluation of at least one of a product, service or experience provided by the provider, a performance of a provider, or the provider itself, capturing a number indicative of a quantity of the one or more captured metrics, and calculating a provider quality score based on the one or more metrics and the number indicative of a quantity of the one or more captured metrics, wherein the provider score provides an indication of future provider performance and future third party reaction to the provider.

In another embodiment, the metrics are review information, and the computer-executable program code portions further may further comprise program code instructions for calculating an average review score based on the one or more metrics and the number indicative of a quantity of metrics. In another embodiment, the computer-executable program code portions further comprise program code instructions for detecting one or more web sources related to provider information, and determining whether the one or more web sources provide metrics related to the provider. In another embodiment, the computer-executable program code portions further comprise program code instructions for detecting a provider website, rating a quality of the provider website, and factoring the quality of the provider website into the provider quality score calculation. In another embodiment, the computer-executable program code portions further comprise program code instructions for accessing prior performance data, wherein prior performance data comprises one or more of data related to a previous provider promotion, data related to a previous promotion promoted by a related provider, or data related to a previous promotion promoted by a different promotion service by the provider, and factoring the prior performance data into the provider quality score calculation.

In another embodiment, the computer-executable program code portions further comprise program code instructions for capturing positive press review information related to a provider, determining if the positive press review information is from an acceptable source, and factoring the positive press review information into the provider quality score calculation. In another embodiment, the computer-executable program code portions further comprise program code instructions for capturing a number of "likes" related to a provider from one or more web sources, and factoring in the number of "likes" into the provider quality score application.

In another embodiment, in an instance in which the average review score is greater than a first predetermined threshold, and the number of reviews is greater than a second predetermined threshold, the computer-executable program code portions further comprise program code instructions for performing a first quality analysis. In another embodiment, in an instance in which the average review score is less than the first predetermined threshold, or the number of reviews is less than the second predetermined threshold, the computer-executable program code portions further comprise program code instructions for performing a second quality analysis. In another embodiment the first quality analysis comprises in an instance in which the average review score is greater than a third predetermined threshold and in an instance in which the number of reviews is greater than a fourth predetermined threshold, performing a third quality analysis.

In another embodiment, the third quality analysis comprises determining whether the provider is associated with a positive press review, in an instance in which the provider is associated with a positive press review, assigning a first provider quality score. In another embodiment, the third quality analysis comprises determining whether the provider is associated with a positive press review, in an instance in which the provider is not associated with a positive press review, assigning a second provider quality score. In another embodiment, the first quality analysis comprises in an instance in which the average review score is less than a third predetermined threshold or in an instance in which the number of reviews is less than a fourth predetermined threshold, performing a fourth quality analysis. In another embodiment, the fourth quality analysis comprises in an instance in which the average review score is at least than a fifth predetermined threshold and in an instance in which the number of reviews is at least a sixth predetermined threshold, assigning a third provider quality score.

In another embodiment, in an instance in which the average review score is less than the fifth predetermined threshold or in an instance in which the number of reviews is less than a sixth predetermined threshold, the computer-executable program code portions further comprise program code instructions for determining a number of "likes". In another embodiment, in an instance in which the average review score is at least the fifth predetermined threshold and in an instance in which the number of "likes" is at least a seventh predetermined threshold, the computer-executable program code portions further comprise program code instructions for assigning a fourth provider quality score. In another embodiment, in an instance in which the average review score is less than the fifth predetermined threshold or in an instance in which the number of "likes" is less than the seventh predetermined threshold, the computer-executable program code portions further comprise program code instructions for assigning a fifth provider quality score.

In another embodiment, the second quality analysis comprises in an instance in which the average review score is less than an eighth predetermined threshold or in an instance in which the number of reviews is less than a tenth predetermined threshold, assigning a tenth provider quality score. In another embodiment, in an instance in which the average review score is greater than an eighth predetermined threshold and in an instance in which the number of reviews is greater than a tenth predetermined threshold, the computer-executable program code portions further comprise program code instructions for performing a fifth quality analysis.

In another embodiment, the fifth quality analysis comprises in an instance in which the average review score is less than a ninth predetermined threshold, assigning an ninth provider quality score. In another embodiment, the fifth quality analysis comprises in an instance in which the average review score is greater than a ninth predetermined threshold, performing a sixth quality analysis. In another embodiment the sixth quality analysis comprises capturing a number of "likes" from one or more web sources, and determining whether the provider is associated with a positive press review from one or more web sources. In another embodiment, in an instance in which the provider is not associated with a positive press review or in an instance in which the number of likes is less than an eleventh predetermined threshold, the computer-executable program code portions further comprise program code instructions for assigning an eighth provider quality score.

In another embodiment in an instance in which the provider is associated with a positive press review, and in an instance in which the number of likes is greater than an eleventh predetermined threshold, the computer-executable program code portions further comprise program code instructions for performing a seventh quality analysis. In another embodiment, the seventh quality analysis comprises in an instance in which the average review score is greater than a twelfth predetermined threshold and in an instance in which the number of "likes" is greater than a thirteenth predetermined threshold, assigning a sixth provider quality score.

In another embodiment, the seventh quality analysis comprises in an instance in which the average review score is less than a twelfth predetermined threshold or in an instance in which the number of "likes" is less than a thirteenth predetermined threshold, assigning a seventh provider quality score. In another embodiment, the computer-executable program code portions further comprise program code instructions for determining whether a provider is associated with an online presence, and in an instance where the provider is not associated with an online presence, assigning a minimum provider quality score.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
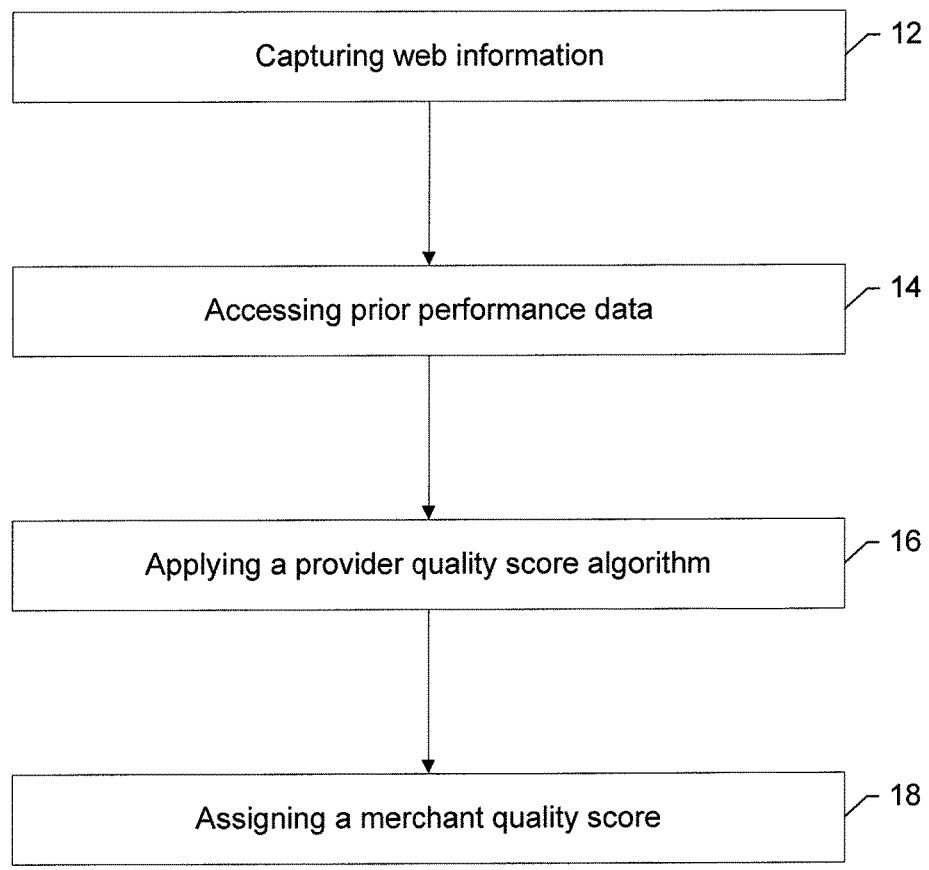
FIG. 1 is a flowchart showing an exemplary process for calculating a provider quality score.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

The methods, apparatus and computer program products described herein are operable to calculate a provider quality score for a potential supply source. In one example, a provider quality score indicates a predicative value that is indicative of how well a provider would perform during a promotion offered by a promotion and marketing service and how consumers would react to the promotion.

In one example, a promotion and marketing system may calculate a demand for a particular promotion and then identify providers to fill the demand. In an instance in which one or more providers are able to provide good, services and/or experiences related to a particular promotion, and the promotion and marketing system identifies them as such, each of one or more providers may be scored and/or valued by one or more metrics. A provider quality score is one metric.

The provider quality score may include factors such as reviews from a plurality of internet sites (e.g., Yelp®, etc.), likes (e.g., Facebook® likes), existence and quality of website, prior offer performance(s), competitor offers, prior performance of related merchants, and/or Hotspots. For example, a decision model may be used to generate a provider quality score. As such, if a merchant has at least an average of 3.0 stars over five reviews, then a merchant may receive a provider quality score of between 6-10 depending on the overall star average, number of reviews and social media like. In other examples, a provider without 3.0 stars over five reviews may receive a high merchant quality score (e.g., 8) if that provider has a large number of likes, a positive review from a predetermined acceptable source and/or the like.

A promotion and marketing service may include a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A provider may include, but is not limited to, a merchant, business owner, consigner, shopkeeper, tradesperson, vender, operator, entrepreneur, agent, dealer, organization, supply source or the like that is in the business of a providing a good, service or experience to a consumer, facilitating the provision of a good, service or experience to a consumer and/or otherwise operating in the stream of commerce. For example, a provider may the form of a running company that sells attire that is generally used by a person who runs or participates in athletic activities.

A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

Consumers may include, but is not limited to, a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

An instrument may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

High Level Process

By way of further example, FIG. 1 is a block a diagram that illustrates an exemplary process for calculating a provider quality score. In general, the process 100 may capture web information and/or access prior performance data. The process 100 may then apply a provider quality score algorithm and assign, determine, or otherwise calculate a provider quality score. In some example embodiments the provider quality score is generated based on a predicted value of how well (e.g., revenue, new business, etc.) a provider will do on a promotion and the customer reaction (e.g. based on historical data, similar results, demand etc.) to the particular promotion.

As shown in block 12 of FIG. 1, an apparatus, such as the apparatus 30 or promotional system 810, may include means, for capturing web information. For example, web information may include information such as reviews from one or more of a plurality of Internet sites (e.g., Yelp®, etc.), likes (e.g., Facebook® likes), an existence and a quality of website. In one embodiment, apparatus 20 may be configured to capture one or more metrics relating to a provider, wherein the one or more metrics are indicative of a third parties evaluation of at least one of a product, service or experience provided by the provider, a performance of a provider, or the provider itself. Additionally or alternatively, apparatus 20 may be configured to capture a number indicative of a quantity of the one or more captured metrics.

As shown in block 14 of FIG. 1, an apparatus, such as the apparatus 30 or promotional system 810, may be configured for accessing prior performance data. Prior performance data may include one or more of prior promotion performance(s), competitor promotions, prior performance of related providers, and/or Hotspots.

As shown in block 16 of FIG. 1, an apparatus, such as the apparatus 30 or promotional system 810, may be configured for applying a provider quality score algorithm. A provider quality score algorithm may utilize factors such as the web information (e.g., reviews from a plurality of internet sites (e.g., Yelp®, etc.), likes (e.g., Facebook® likes), existence and quality of website, award, press releases or the like) and prior performance data.

As shown in block 18 of FIG. 1, an apparatus, such as the apparatus 30 or promotional system 810, may include means, for assigning, calculating or determining a provider quality score. Assigning, calculating or determining a provider quality score is further described with respect to FIGS. 5-7. In one embodiment, apparatus 20 may be configured to calculate a provider quality score based on one or more metrics and a number indicative of a quantity of the one or more captured metrics, wherein the provider score provides an indication of future provider performance and future third party reaction to the provider.

For example, if a merchant has at least an average of 3.0 stars with over five reviews, then a merchant may receive a provider quality score of between 6-10 depending on the overall star average, number of reviews and social media likes. In other examples, a provider without 3.0 stars or over five reviews may receive a high provider quality score (e.g., 8) if that provider has a large number of likes, a positive review from a predetermined acceptable source and/or the like.

System and Apparatus

Figure 2:
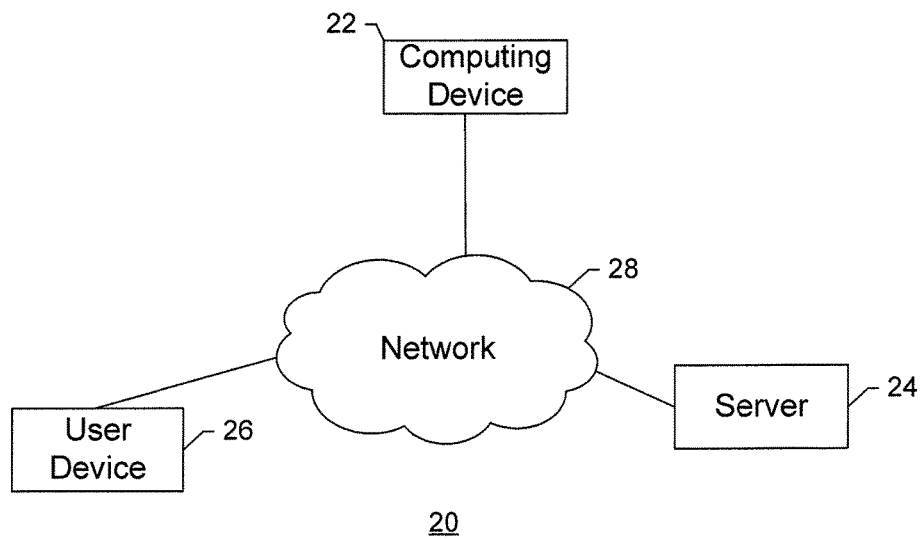
FIG. 2 is block diagram of a system that may be specifically configured in accordance with an example embodiment of the present invention.

Referring now of FIG. 2, a system that supports communication, either wirelessly or via a wireline, between a computing device 22 and a server 24 or other network entity (hereinafter generically referenced as a "server") is illustrated. As shown, the computing device and the server may be in communication via a network 28, such as a wide area network, such as a cellular network or the Internet or a local area network. However, the computing device and the server may be in communication in other manners, such as via direct communications between the computing device and the server.

The computing device 22 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 24 may also be embodied by a computing device and, in one embodiment, is embodied by a web server. Additionally, while the system of FIG. 2 depicts a single server, the server may be comprised of a plurality of servers which may collaborate to support browsing activity conducted by the computing device.

Figure 3:
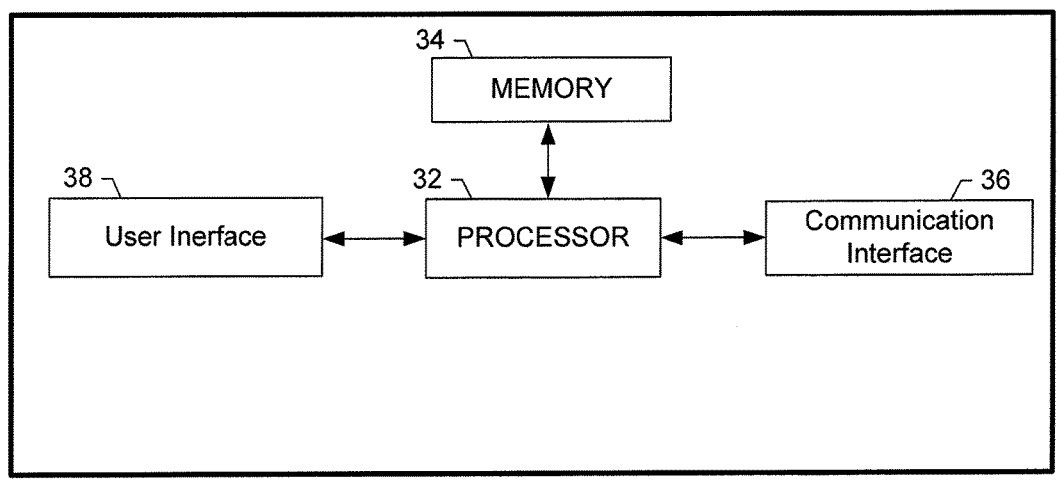
FIG. 3 is a block diagram of an apparatus that may be specifically configured in accordance with an example embodiment of the present invention.

Regardless of the type of device that embodies the computing device 22, the computing device may include or be associated with an apparatus 30 as shown in FIG. 3. In this regard, the apparatus may include or otherwise be in communication with a processor 32, a memory device 34, a communication interface 36 and a user interface 38. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 32 (and/or co-processors or any other processing circuitry assisting or otherwise associated with the processor) may be in communication with the memory device 34 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 30 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 30 may be embodied by a computing device 22 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 36 may be any means such as a device or circuitry embodied in either hardware or a combination of hardware and software that is configured to receive and/or transmit data between the computing device 22 and a server 24. In this regard, the communication interface 36 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 38 may be in communication with the processor 32, such as the user interface circuitry, to receive an indication of a user input and/or to provide an audible, visual, mechanical, or other output to a user. As such, the user interface may include, for example, a keyboard, a mouse, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 34 and/or the communication interface 36, such as via a bus.

FIGS. 4, 5, 6, and 7 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 34 of an apparatus employing an embodiment of the present invention and executed by a processor 32 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4, 5, 6, and 7, when executed, convert a computer or processing circuitry into a particular machine configured to perform an example embodiment of the present invention. Accordingly, the operations of FIGS. 4, 5, 6, and 7 define an algorithm for configuring a computer or processing to perform an example embodiment. In some cases, a general purpose computer may be provided with an instance of the processor which performs the algorithms of FIGS. 4, 5, 6, and 7 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Process 400

Figure 4:
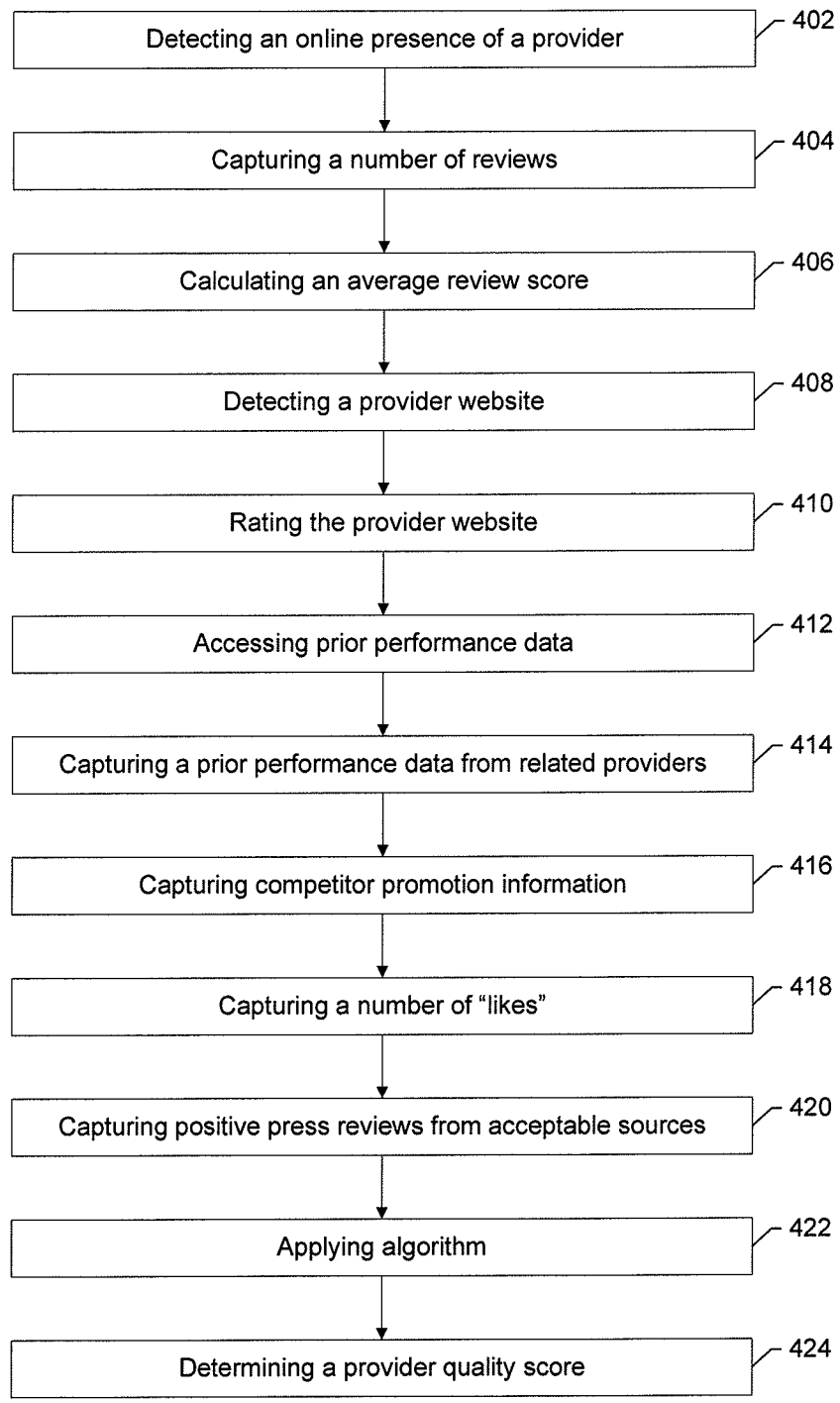
FIG. 4 shows a flow chart showing an exemplary process of assigning, calculating, or determining a provider quality score in accordance with some embodiments discussed herein.

FIG. 4 shows an example method, namely process 400, that may be executed by one or more machines (some examples of which are discussed in connection with FIGS. 2, 3, and/or 8) to assign, calculate or determine a provider quality score to a provider, in accordance with some embodiments discussed herein. In some example embodiments the provider quality score is generated based on a predicted value of how well (e.g., revenue, new business, etc.) a provider will do on a promotion and the customer reaction (e.g., based on historical data, similar results, demand etc.) to the particular promotion.

As shown in block 402 of FIG. 4, an apparatus, such as the apparatus 30 or promotional system 810, may include means, such as detection module 814, capturing module 816, calculating module 818, processor 32, or the like, for detecting an online presence of a provider. An online presence may be information indicating that the provider is in business. An online presence may be a provider website, provider information offered or displayed on a third party website, provider reviews provided on a review type website (e.g., "www.yelp.com" or "www.zagat.com"), or the like.

As shown in block 404 of FIG. 4, an apparatus, such as the apparatus 30 or promotional system 810, may include means, such as detection module 814, capturing module 816, calculating module 818, processor 32, or the like, for capturing a number of reviews of the provider on each of one or more detected instances. For example a provider may have 1,000 reviews on Yelp® and 500 reviews on a different website, such as Zagat®.

As shown in block 406 of FIG. 4, an apparatus, such as the apparatus 30 or promotional system 810, may include means, such as detection module 814, capturing module 816, calculating module 818, processor 32, or the like, for calculating an average review score of the review determined with respect to block 404. In some example embodiments, the average review score can be determined for each website that provides reviews, it can be determined globally across all websites having at least one unique review and/or the like.

As shown in block 408 of FIG. 4, an apparatus, such as the apparatus 30 or promotional system 810, may include means, such as detection module 814, capturing module 816, calculating module 818, processor 32, or the like, for detecting a provider website. In some example embodiments, the provider website may be provided by the provider, be indicated in a provider database, be determined based on a reference in a third party website, be discovered via a search engine or the like.

As shown in block 410 of FIG. 4, an apparatus, such as the apparatus 30 or promotional system 810, may include means, such as detection module 814, capturing module 816, calculating module 818, processor 32, or the like, for rating a provider website.

As shown in block 412 of FIG. 4, an apparatus, such as the apparatus 30 or promotional system 810, may include means, such as detection module 814, capturing module 816, calculating module 818, processor 32, or the like, for accessing prior performance data. In one embodiment, prior performance data may include data indicating one or more previous promotions and related performance of those promotions. For example, prior performance data may indicate 300 units of a promotion lasting for 60 days were sold in by a provider offering a "beauty, wellness, and healthcare" category, "salon tanning" sub-category or the like.

As shown in block 414 of FIG. 4, an apparatus, such as the apparatus 30 or promotional system 810, may include means, such as detection module 814, capturing module 816, calculating module 818, processor 32, or the like, for capturing prior performance data from related providers.

Prior performance from related providers may also indicate past performance of promotions that were offered by related providers. For example, if a provider may offer a promotion in a specific category, sub-category, location, hyper-location or the like, block 414 may be configured to capture information related to the performance of other promotions offer by other providers in the same or similar categories, sub-categories, locations, hyper-locations, price ranges and the like.

As shown in block 416 of FIG. 4, an apparatus, such as the apparatus 30 or promotional system 810, may include means, such as detection module 814, capturing module 816, calculating module 818, processor 32, or the like, for capturing competitor promotion information. In one embodiment, a web data capturing algorithm or machine may be used to capture information related to promotions offered on other promotion and marketing services. The prior performance data from competitor promotion information may indicate a category, sub-category, location, hyper-location, price range or the like as well as units sold.

As shown in block 418 of FIG. 4, an apparatus, such as the apparatus 30 or promotional system 810, may include means, such as detection module 814, capturing module 816, calculating module 818, processor 32, or the like, for detecting a number of and/or capturing "likes" from a web source. For example, detecting that the provider has a specific number (e.g., 100) "likes" on Facebook® and/or capturing that information.

As shown in block 420 of FIG. 4, an apparatus, such as the apparatus 30 or promotional system 810, may include means, such as detection module 814, capturing module 816, calculating module 818, processor 32, or the like, for capturing positive press reviews from acceptable sources. In one embodiment, the apparatus may be configured to detect reviews and determine if the source is an acceptable source. Blocks 636 and 638 further expand and provide examples related to detecting press reviews and determining whether the press reviews are from acceptable sources.

Figure 5:
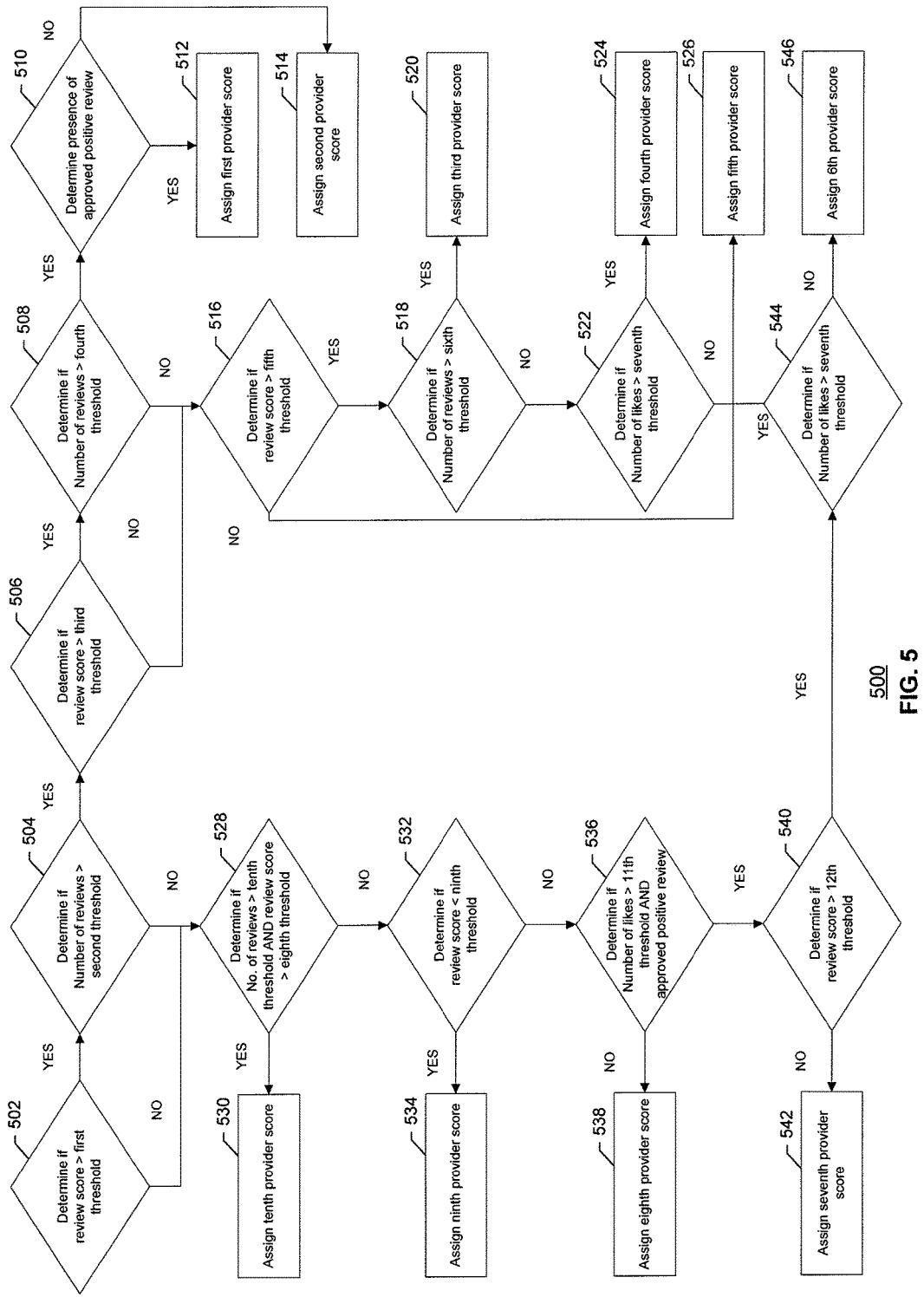
FIG. 5 shows a flowchart showing an exemplary process for calculating a provider quality score, in accordance with some embodiments discussed herein.
Figure 6:
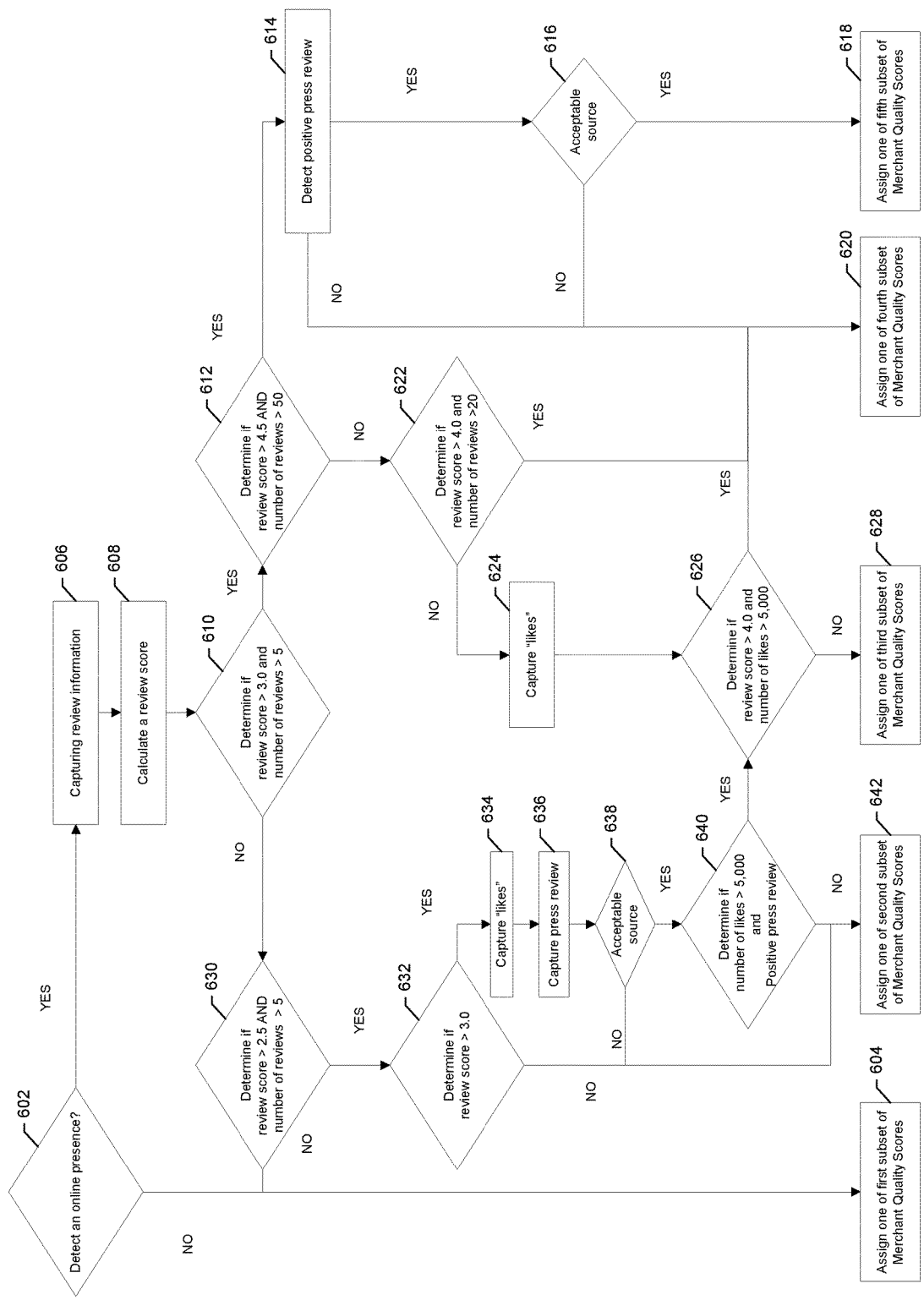
FIG. 6 shows a flowchart showing an exemplary process for calculating a provider quality score, in accordance with some embodiments discussed herein.
Figure 7:
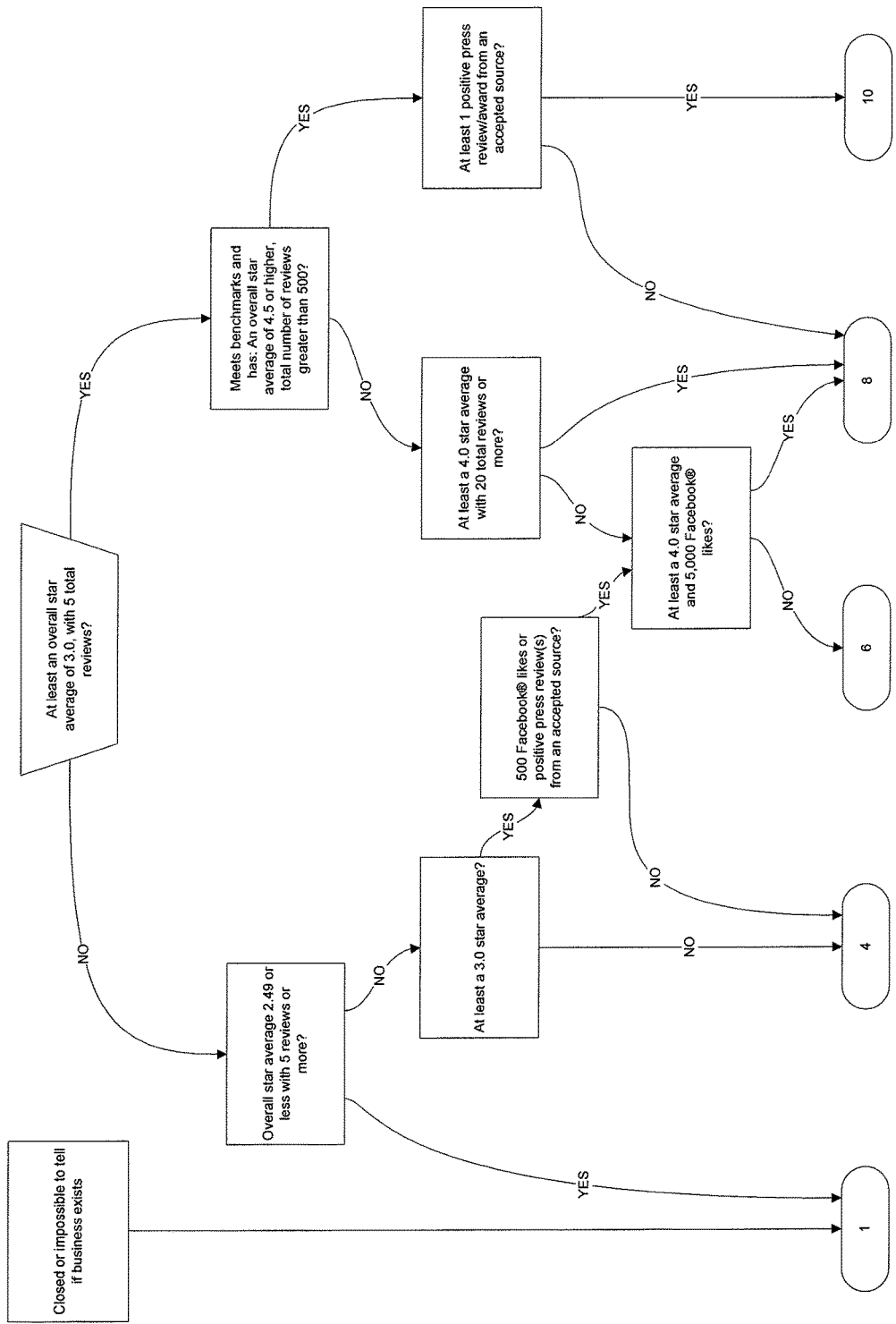
FIG. 7 shows a flowchart showing an exemplary process for calculating a provider quality score, in accordance with some embodiments discussed herein.

As shown in block 422 of FIG. 4, an apparatus, such as the apparatus 30 or promotional system 810, may include means, such as detection module 814, capturing module 816, calculating module 818, processor 32, or the like, for applying a scoring algorithm. FIGS. 5, 6, and 7 show examples of scoring algorithms.

As shown in block 424 of FIG. 4, an apparatus, such as the apparatus 30 or promotional system 810, may include means, such as detection module 814, capturing module 816, calculating module 818, processor 32, or the like, for assigning, calculating and/or determining a provider quality score.

Process 500

FIG. 5 shows an example method, namely process 500, that may be executed by one or more machines (some examples of which are discussed in connection with FIGS. 2, 3, and/or 8) to assign one of ten provider quality scores, in accordance with some embodiments discussed herein.

As shown in block 502 of FIG. 5, an apparatus, such as the apparatus 30 or promotional system 810, may include means, such as detection module 814, capturing module 816, calculating module 818, processor 32, or the like, for determining if an average review score is greater than or equal to at least a first threshold.

If the determination at block 502 yields a yes, process 500 proceeds to block 504. If the determination at block 502 yields a no, the process proceeds to block 528, which will be discussed later.

As shown in block 504 of FIG. 5, an apparatus, such as the apparatus 30 or promotional system 810, may include means, such as detection module 814, capturing module 816, calculating module 818, processor 32, or the like, for determining if a number of reviews is greater than or equal to at least a second threshold.

If the determination at block 504 yields a yes, process 500 proceeds to block 506. If the determination at block 504 yields a no, the process proceeds to block 528, which will be discussed later.

As shown in block 506 of FIG. 5, an apparatus, such as the apparatus 30 or promotional system 810, may include means, such as detection module 814, capturing module 816, calculating module 818, processor 32, or the like, for determining if an average review score is greater than or equal to at least a third threshold.

If the determination at block 506 yields a yes, process 500 proceeds to block 508. If the determination at block 506 yields a no, the process proceeds to block 516, which will be discussed later.

As shown in block 508 of FIG. 5, an apparatus, such as the apparatus 30 or promotional system 810, may include means, such as detection module 814, capturing module 816, calculating module 818, processor 32, or the like, for determining if a number of reviews is greater than or equal to at least a fourth threshold.

If the determination at block 508 yields a yes, process 500 proceeds to block 510. If the determination at block 508 yields a no, the process proceeds to block 516, which will be discussed later.

As shown in block 510 of FIG. 5, an apparatus, such as the apparatus 30 or promotional system 810, may include means, such as detection module 814, capturing module 816, calculating module 818, processor 32, or the like, for determining whether a provider is the subject of a positive press review from an acceptable source.

If the determination at block 510 yields a yes, process 500 proceeds to block 512. If the determination at block 510 yields a no, the process proceeds to block 514, which will be discussed later.

As shown in block 512 of FIG. 5, an apparatus, such as the apparatus 30 or promotional system 810, may include means, such as detection module 814, capturing module 816, calculating module 818, processor 32, or the like, for assigning a first provider quality score.

As shown in block 514 of FIG. 5, an apparatus, such as the apparatus 30 or promotional system 810, may include means, such as detection module 814, capturing module 816, calculating module 818, processor 32, or the like, for assigning a second provider quality score.

As shown in block 516 of FIG. 5, an apparatus, such as the apparatus 30 or promotional system 810, may include means, such as detection module 814, capturing module 816, calculating module 818, processor 32, or the like, for determining if an average review score is greater than or equal to at least a fifth threshold.

If the determination at block 516 yields a yes, process 500 proceeds to block 518. If the determination at block 516 yields a no, the process proceeds to block 526, which will be discussed later.

As shown in block 518 of FIG. 5, an apparatus, such as the apparatus 30 or promotional system 810, may include means, such as detection module 814, capturing module 816, calculating module 818, processor 32, or the like, for determining if a number of reviews is greater than or equal to at least a sixth threshold.

If the determination at block 518 yields a yes, process 500 proceeds to block 520. If the determination at block 518 yields a no, the process proceeds to block 522, which will be discussed later.

As shown in block 520 of FIG. 5, an apparatus, such as the apparatus 30 or promotional system 810, may include means, such as detection module 814, capturing module 816, calculating module 818, processor 32, or the like, for assigning a third provider quality score.

As shown in block 522 of FIG. 5, an apparatus, such as the apparatus 30 or promotional system 810, may include means, such as detection module 814, capturing module 816, calculating module 818, processor 32, or the like, for determining if a number of "likes" is greater than or equal to at least a seventh threshold.

If the determination at block 522 yields a yes, process 500 proceeds to block 524. If the determination at block 522 yields a no, the process proceeds to block 526, which will be discussed later.

As shown in block 524 of FIG. 5, an apparatus, such as the apparatus 30 or promotional system 810, may include means, such as detection module 814, capturing module 816, calculating module 818, processor 32, or the like, for assigning a fourth provider quality score.

As shown in block 526 of FIG. 5, an apparatus, such as the apparatus 30 or promotional system 810, may include means, such as detection module 814, capturing module 816, calculating module 818, processor 32, or the like, for assigning a fifth provider quality score.

As shown in block 528 of FIG. 5, an apparatus, such as the apparatus 30 or promotional system 810, may include means, such as detection module 814, capturing module 816, calculating module 818, processor 32, or the like, for determining if a number of reviews is greater than or equal to at least a tenth threshold and if the average review score is less than an eighth threshold.

If the determination at block 528 yields a yes, process 500 proceeds to block 530. If the determination at block 528 yields a no, the process proceeds to block 532, which will be discussed later.

As shown in block 530 of FIG. 5, an apparatus, such as the apparatus 30 or promotional system 810, may include means, such as detection module 814, capturing module 816, calculating module 818, processor 32, or the like, for assigning a tenth provider quality score.

As shown in block 532 of FIG. 5, an apparatus, such as the apparatus 30 or promotional system 810, may include means, such as detection module 814, capturing module 816, calculating module 818, processor 32, or the like, for determining if the average review score is less than a ninth threshold.

If the determination at block 532 yields a yes, process 500 proceeds to block 534. If the determination at block 532 yields a no, the process proceeds to block 536, which will be discussed later.

As shown in block 534 of FIG. 5, an apparatus, such as the apparatus 30 or promotional system 810, may include means, such as detection module 814, capturing module 816, calculating module 818, processor 32, or the like, for assigning a ninth provider quality score.

As shown in block 536 of FIG. 5, an apparatus, such as the apparatus 30 or promotional system 810, may include means, such as detection module 814, capturing module 816, calculating module 818, processor 32, or the like, for determining if a number of "likes" is greater than or equal to at least an eleventh threshold and for determining whether a provider is the subject of a positive press review from an acceptable source.

If the determination at block 536 yields a no, process 500 proceeds to block 538. If the determination at block 536 yields a yes, the process proceeds to block 540, which will be discussed later.

As shown in block 538 of FIG. 5, an apparatus, such as the apparatus 30 or promotional system 810, may include means, such as detection module 814, capturing module 816, calculating module 818, processor 32, or the like, for assigning an eighth provider quality score.

As shown in block 540 of FIG. 5, an apparatus, such as the apparatus 30 or promotional system 810, may include means, such as detection module 814, capturing module 816, calculating module 818, processor 32, or the like, for determining if the average review score is greater than or equal to at least a twelfth threshold.

If the determination at block 540 yields a no, process 500 proceeds to block 542. If the determination at block 540 yields a yes, the process proceeds to block 544, which will be discussed later.

As shown in block 542 of FIG. 5, an apparatus, such as the apparatus 30 or promotional system 810, may include means, such as detection module 814, capturing module 816, calculating module 818, processor 32, or the like, for assigning a seventh provider quality score.

As shown in block 544 of FIG. 5, an apparatus, such as the apparatus 30 or promotional system 810, may include means, such as detection module 814, capturing module 816, calculating module 818, processor 32, or the like, for determining if a number of "likes" is greater than or equal to at least a seventh threshold.

If the determination at block 544 yields a yes, process 500 proceeds to block 526 where a fifth provider quality score may be assigned. If the determination at block 544 yields a no, the process proceeds to block 546.

As shown in block 546 of FIG. 5, an apparatus, such as the apparatus 30 or promotional system 810, may include means, such as detection module 814, capturing module 816, calculating module 818, processor 32, or the like, for assigning a sixth provider quality score.

Process 600

FIG. 6 shows an example method, namely process 600, that may be executed by one or more machines (some examples of which are discussed in connection with FIGS. 2, 3, and/or 8) to assign provider quality scores, in accordance with some embodiments discussed herein.

As shown in block 602 of FIG. 6, an apparatus, such as the apparatus 30 or promotional system 810, may include means, such as detection module 814, capturing module 816, calculating module 818, processor 32, or the like, for detecting an online presence of a provider. An online presence may be information indicating that the provider is in business. An online presence may be a provider website, provider information offered or displayed on a third party website, provider reviews provided on a review type website (e.g., "www.yelp.com" or "www.zagat.com"), or the like.

If the determination at block 602 yields a no, process 600 proceeds to block 604. If the determination at block 602 yields a yes, process 600 proceeds to block 606.

As shown in block 604 of FIG. 6, an apparatus, such as the apparatus 30 or promotional system 810, may include means, such as detection module 814, capturing module 816, calculating module 818, processor 32, or the like, for assigning one of a first subset of provider quality scores to the provider.

As shown in block 606 of FIG. 6, an apparatus, such as the apparatus 30 or promotional system 810, may include means, such as detection module 814, capturing module 816, calculating module 818, processor 32, or the like, for capturing review information.

Review information may be provided by one or more review type websites, web or network sources, or databases, internal or external. In one embodiment, a website may provide a star rating (e.g., 1 star, 2 stars . . . 5 stars) and a number of reviews factored into calculating the star rating (e.g., 130 reviews). In another embodiment, a website may provide a plurality of different categories that have been reviewed. For example, a website may provide separate reviews for a product, a service, a cost, a value, décor, or the like, where a provider may be reviewed on each of one or more of the categories. For example, a pizza restaurant may be reviewed based on "food", "service", and "décor".

In another embodiment, the review information that may be captured may be ranked. For example, a review website may provide reviews as rankings. For example, when looking at "pizza restaurants" in a locations, the pizza restaurants may be displayed in a ranked format or provided with an associated ranking. Additionally, each of a plurality of categories may be ranked. For example, a pizza restaurant may have review information indicating the $23^{rd}$ best food, $8^{th}$ best service, and $15^{th}$ best décor.

In another embodiment, review information may be provided by a review website in a format indicating a percentage of reviewers who "liked it." For example, a pizza restaurant may have review information indicating that "81% liked it."

As shown in block 608 of FIG. 6, an apparatus, such as the apparatus 30 or promotional system 810, may include means, such as detection module 814, capturing module 816, calculating module 818, processor 32, or the like, for calculating a review score.

In an instance in which a start rating and a number of reviews is provided, a review score may be determined by using the star rating. In an instance where more than one source of review information is captured and utilized for calculating an aggregated review score, the star rating and the number of reviews may be factored into the aggregated review score.

In an instance in which captured review information is in a format divided into a plurality of categories, the review score may use any one category, an average of any two or more categories, or a weighted average of any two or more categories. A determination on which to use may be dependent on a category, sub-category, location, hyper-location, or price of a promotion and/or service that the provider is expected to provide. For example, sub-category "burger restaurants" may utilize review information from one reviewed category (e.g., "food"), "Italian restaurants" may utilize an average of two reviewed categories (e.g., "food" and "service"), and "Asian restaurants" may utilize a weighted average of three reviewed categories (e.g., 40% "décor", 40% "food", and 20% "service").

In an instance where review information is in a format indicating a percentage of reviewers that "liked it", the review score may be calculated or determined based on "buckets". For example, a review score of 1.0 may be calculated for providers with review information indicating that 0%-20% "liked it, a 2.0 for 21%-40%, 3.0 for 41%-60, a 4.0 for 61%-80% and a 5.0 for 81%-100%. The "buckets" may be smaller and the review scores divided into 0.5 s, such as for example, a 0.5 for 0%-10%, a 1.5 for 30%-40%, 2.5 for 50%-60%, a 3.5 for 70%-80% and a 4.5 for 90%-100%.

As shown in block 610 of FIG. 6, an apparatus, such as the apparatus 30 or promotional system 810, may include means, such as detection module 814, capturing module 816, calculating module 818, processor 32, or the like, for determining if a review score is greater than or equal to at least a predetermined threshold, e.g., 3.0 and if a number of reviews is greater than or equal to at least a second predetermined threshold, e.g., 5 reviews.

If the determination at block 610 yields a no, process 600 proceeds to block 630, which will be discussed later. If the determination at block 610 yields a yes, process 600 proceeds to block 612.

As shown in block 612 of FIG. 6, an apparatus, such as the apparatus 30 or promotional system 810, may include means, such as detection module 814, capturing module 816, calculating module 818, processor 32, or the like, for determining if a review score is greater than or equal to at least a third predetermined threshold, e.g., 4.5 and if a number of reviews is greater than or equal to at least a fourth predetermined threshold, e.g., 50 reviews. In one embodiment, the third predetermined threshold is any number greater than the first predetermined threshold. Additionally or alternatively, the fourth predetermined threshold is any number greater than the second predetermined threshold.

If the determination at block 612 yields a no, process 600 proceeds to block 622, which will be discussed later. If the determination at block 610 yields a yes, process 600 proceeds to block 614.

As shown in block 614 of FIG. 6, an apparatus, such as the apparatus 30 or promotional system 810, may include means, such as detection module 814, capturing module 816, calculating module 818, processor 32, or the like, for detecting a positive press review and/or capturing a positive press review from a web source. For example, the New York Times® may print, either online or hardcopy, an article related to a provider. In one embodiment, the apparatus may detect any press review and determine if the press review is positive based on a rating given (e.g., "4 stars" or "thumbs up") in the press review, keywords or phrases (e.g., "delicious", "outstanding", "excellent" or the like) or a mere inclusion (e.g., "Top ten brunch spots in the city", "Best of 2013", "Featured Selection of the Month" or the like).

If a positive press review is found or determined to exist at block 614, process 600 proceeds to block 616. If a positive press review is not found or determined not to exist at block 614, process 600 proceeds to block 620, which will be discussed later.

As shown in block 616 of FIG. 6, an apparatus, such as the apparatus 30 or promotional system 810, may include means, such as detection module 814, capturing module 816, calculating module 818, processor 32, or the like, for determining if the positive press review represents an acceptable source of information. In one embodiment, acceptable sources of information may be stored in advance, and block 616 may compare the source of the positive press review to the stored acceptable sources. In another embodiment, the source of the positive press review may be scored. Scoring of a source of a positive press review may involve subjecting the source to one or more provider quality scoring algorithms.

As shown in block 618 of FIG. 6, an apparatus, such as the apparatus 30 or promotional system 810, may include means, such as detection module 814, capturing module 816, calculating module 818, processor 32, or the like, for assigning one of a fifth subset of provider quality scores to the provider.

As shown in block 620 of FIG. 6, an apparatus, such as the apparatus 30 or promotional system 810, may include means, such as detection module 814, capturing module 816, calculating module 818, processor 32, or the like, for assigning one of a fourth subset of provider quality scores to the provider.

As shown in block 622 of FIG. 6, an apparatus, such as the apparatus 30 or promotional system 810, may include means, such as detection module 814, capturing module 816, calculating module 818, processor 32, or the like, for determining if a review score is greater than or equal to at least a fifth predetermined threshold, e.g., 4.0 and if a number of reviews is greater than or equal to at least a sixth predetermined threshold, e.g., 20 reviews. In one embodiment, the fifth predetermined threshold is any number greater than the first predetermined threshold and/or less than the third predetermined threshold. Additionally or alternatively, the sixth predetermined threshold is any number greater than the second predetermined threshold and/or less than the fourth predetermined threshold.

If the determination at block 622 yields a yes, process 600 proceeds to block 620, where a provider is assigned one of a fourth subset of provider quality scores. If the determination at block 622 yields a no, process 600 proceeds to block 624.

As shown in block 624 of FIG. 6, an apparatus, such as the apparatus 30 or promotional system 810, may include means, such as detection module 814, capturing module 816, calculating module 818, processor 32, or the like, for detecting a number of and/or capturing "likes" from a web source. For example, detecting that the provider has a specific number (e.g., 100) "likes" on Facebook® and/or capturing that information.

As shown in block 626 of FIG. 6, an apparatus, such as the apparatus 30 or promotional system 810, may include means, such as detection module 814, capturing module 816, calculating module 818, processor 32, or the like, for determining if a review score is greater than or equal to at least a fifth predetermined threshold, e.g., 4.0 and if a number of "likes" is greater than or equal to at least an eighth predetermined threshold, e.g., 5,000 likes. In one embodiment, the fifth predetermined threshold is any number greater than the first predetermined threshold and/or less than the third predetermined threshold.

Additionally or alternatively, block 624 may capture a percentage of likes (e.g., information such as "85% of people liked provider Y") and block 626 may determine if that percentage is greater than or equal to at least a predetermined percentage.

If the determination at block 626 yields a yes, process 600 proceeds to block 620, where a provider is assigned one of a fourth subset of provider quality scores. If the determination at block 622 yields a no, process 600 proceeds to block 628.

As shown in block 628 of FIG. 6, an apparatus, such as the apparatus 30 or promotional system 810, may include means, such as detection module 814, capturing module 816, calculating module 818, processor 32, or the like, for assigning one of a third subset of provider quality scores to the provider.

As shown in block 630 of FIG. 6, an apparatus, such as the apparatus 30 or promotional system 810, may include means, such as detection module 814, capturing module 816, calculating module 818, processor 32, or the like, for determining if a review score is greater than or equal to at least a ninth predetermined threshold, e.g., 2.5 and if a number of reviews is greater than or equal to at least a predetermined threshold such as, for example, the first predetermined threshold, e.g., 5 reviews. In one embodiment, the ninth predetermined threshold is any number less than the first predetermined threshold.

If the determination at block 630 yields a no indicating for example a low review score and a sufficient number of reviews, process 600 proceeds to block 604, where a provider is assigned one of a first subset of provider quality scores. If the determination at block 630 yields a yes, process 600 proceeds to block 632.

As shown in block 632 of FIG. 6, an apparatus, such as the apparatus 30 or promotional system 810, may include means, such as detection module 814, capturing module 816, calculating module 818, processor 32, or the like, for determining if a review score is greater than or equal to at least a tenth predetermined threshold, e.g., 3.0.

If the determination at block 632 yields a no indicating for example a low review score and a sufficient number of reviews, process 600 proceeds to block 642, which is discussed later. If the determination at block 632 yields a yes, process 600 proceeds to block 634.

As shown in block 634 of FIG. 6, an apparatus, such as the apparatus 30 or promotional system 810, may include means, such as detection module 814, capturing module 816, calculating module 818, processor 32, or the like, for detecting a number of and/or capturing "likes" from a web source. For example, detecting that the provider has a specific number (e.g., 100) "likes" on Facebook® and/or capturing that information.

As shown in block 636 of FIG. 6, an apparatus, such as the apparatus 30 or promotional system 810, may include means, such as detection module 814, capturing module 816, calculating module 818, processor 32, or the like, for detecting a positive press review and/or capturing a positive press review from a web source. For example, the New York Times® may print, either online or hardcopy, an article related to a provider. In one embodiment, the apparatus may detect any press review and determine if the press review is positive based on a rating given (e.g., "4 stars" or "thumbs up") in the press review, keywords or phrases (e.g., "delicious", "outstanding", "excellent" or the like) or a mere inclusion (e.g., "Top ten brunch spots in the city", "Best of 2013", "Featured Selection of the Month" or the like).

As shown in block 638 of FIG. 6, an apparatus, such as the apparatus 30 or promotional system 810, may include means, such as detection module 814, capturing module 816, calculating module 818, processor 32, or the like, for determining if the positive press review represents an acceptable source of information. In one embodiment, acceptable sources of information may be stored in advance, and block 616 may compare the source of the positive press review to the stored acceptable sources. In another embodiment, the source of the positive press review may be scored. Scoring of a source of a positive press review may involve subjecting the source to one or more provider quality scoring algorithms.

As shown in block 640 of FIG. 6, an apparatus, such as the apparatus 30 or promotional system 810, may include means, such as detection module 814, capturing module 816, calculating module 818, processor 32, or the like, for determining if a number of "likes' is greater than or equal to at least a predetermined threshold such as, for example, the eighth predetermined threshold, e.g., 5,000 likes. In one embodiment, the predetermined threshold could be any predetermined number of likes.

If the determination at block 640 yields a no, process 600 proceeds to block 642, which is discussed below. If the determination at block 640 yields a yes, process 600 proceeds to block 626 discussed above.

As shown in block 642 of FIG. 6, an apparatus, such as the apparatus 30 or promotional system 810, may include means, such as detection module 814, capturing module 816, calculating module 818, processor 32, or the like, for assigning one of a second subset of provider quality scores to the provider.

Supply Source Quality Score Calculation Example

FIG. 7 shows an example method, namely process 700, that may be executed by one or more machines (some examples of which are discussed in connection with FIGS. 2, 3, and/or 8) to assign, calculate, or determine a provider quality score, in accordance with some embodiments discussed herein.

As shown in block 702 of FIG. 7, an apparatus, such as the apparatus 30 or promotional system 810, may include means, such as detection module 814, capturing module 816, calculating module 818, processor 32, or the like, for determining if a provider has an overall star average greater than or equal to at least a 3.0 with greater than or equal to at least 5 total reviews.

If the determination at block 702 yields a yes, the process 700 proceeds to block 704. As shown in block 704 of FIG. 7, an apparatus, such as the apparatus 30 or promotional system 810, may include means, such as detection module 814, capturing module 816, calculating module 818, processor 32, or the like, for determining if a provider has an overall star average greater than or equal to at least a 4.5 with greater than or equal to at least 500 total number reviews.

If the determination at block 704 yields a yes, the process 700 proceeds to block 706. As shown in block 706 of FIG. 7, an apparatus, such as the apparatus 30 or promotional system 810, may include means, such as detection module 814, capturing module 816, calculating module 818, processor 32, or the like, for determining if a provider has a positive press review or award from an accepted source.

If the determination at block 706 yields a yes, the process 700 proceeds to block 708. As shown in block 708 of FIG. 7, an apparatus, such as the apparatus 30 or promotional system 810, may include means, such as detection module 814, capturing module 816, calculating module 818, processor 32, or the like, for assigning a provider a score of 10.

If the determination at block 704 yields a no, the process 700 proceeds to block 710. As shown in block 710 of FIG. 7, an apparatus, such as the apparatus 30 or promotional system 810, may include means, such as detection module 814, capturing module 816, calculating module 818, processor 32, or the like, for determining if a provider has an overall star average greater than or equal to at least a 4.0 with greater than or equal to at least 20 total reviews.

If the determination at block 710 yields a yes, the process 700 proceeds to block 712. As shown in block 712 of FIG. 7, an apparatus, such as the apparatus 30 or promotional system 810, may include means, such as detection module 814, capturing module 816, calculating module 818, processor 32, or the like, for assigning a provider a score of 8.

If the determination at block 710 yields a no, the process 700 proceeds to block 714. As shown in block 714 of FIG. 7, an apparatus, such as the apparatus 30 or promotional system 810, may include means, such as detection module 814, capturing module 816, calculating module 818, processor 32, or the like, for determining if a provider has an overall star average of greater than or equal to at least a 4.0 with greater than or equal to at least 5,000 "likes", such as for example, Facebook® "likes".

If the determination at block 714 yields a yes, the process 700 proceeds to block 712, where the provider is assigned a score of 8. If the determination at block 714 yields a no, the process 700 proceeds to block 716. As shown in block 716 of FIG. 7, an apparatus, such as the apparatus 30 or promotional system 810, may include means, such as detection module 814, capturing module 816, calculating module 818, processor 32, or the like, for assigning a provider a score of 6.

If the determination at block 702 yields a no, the process 700 proceeds to block 718. As shown in block 718 of FIG. 7, an apparatus, such as the apparatus 30 or promotional system 810, may include means, such as detection module 814, capturing module 816, calculating module 818, processor 32, or the like, determining if a provider has an overall star rating of less than or equal to at least a 2.49 with greater than or equal to at least 5 total reviews.

If the determination at block 718 yields a yes, the process 700 proceeds to block 720. As shown in block 720 of FIG. 7, an apparatus, such as the apparatus 30 or promotional system 810, may include means, such as detection module 814, capturing module 816, calculating module 818, processor 32, or the like, for assigning a provider a score of 1.

If the determination at block 718 yields a no, the process 700 proceeds to block 722. As shown in block 722 of FIG. 7, an apparatus, such as the apparatus 30 or promotional system 810, may include means, such as detection module 814, capturing module 816, calculating module 818, processor 32, or the like, for determining if a provider has an overall star average of greater than or equal to at least a 3.0.

If the determination at block 722 yields a no, the process 700 proceeds to block 724. As shown in block 724 of FIG. 7, an apparatus, such as the apparatus 30 or promotional system 810, may include means, such as detection module 814, capturing module 816, calculating module 818, processor 32, or the like, for assigning a provider a score of 4.

If the determination at block 722 yields a yes, the process 700 proceeds to block 726. As shown in block 726 of FIG. 7, an apparatus, such as the apparatus 30 or promotional system 810, may include means, such as detection module 814, capturing module 816, calculating module 818, processor 32, or the like, for determining if a provider has an a positive press review or award from an acceptable source and has greater than or equal to at least 5,000 "likes", such as for example, Facebook® "likes".

If the determination at block 726 yields a no, the process 700 proceeds to block 724 where the provider is assigned a score of 4. If the determination at block 726 yields a yes, the process 700 proceeds to block 714.

As shown in block 728 of FIG. 7, an apparatus, such as the apparatus 30 or promotional system 810, may include means, such as detection module 814, capturing module 816, calculating module 818, processor 32, or the like, for determining if a provider is closed or determining if a provider is closed is impossible. If block 728 determines that a provider is closed or cannot tell if the provider is closed, the process 700 proceeds to block 720 where the provider is assigned a score of 1.

Promotion and Marketing System

Figure 8:
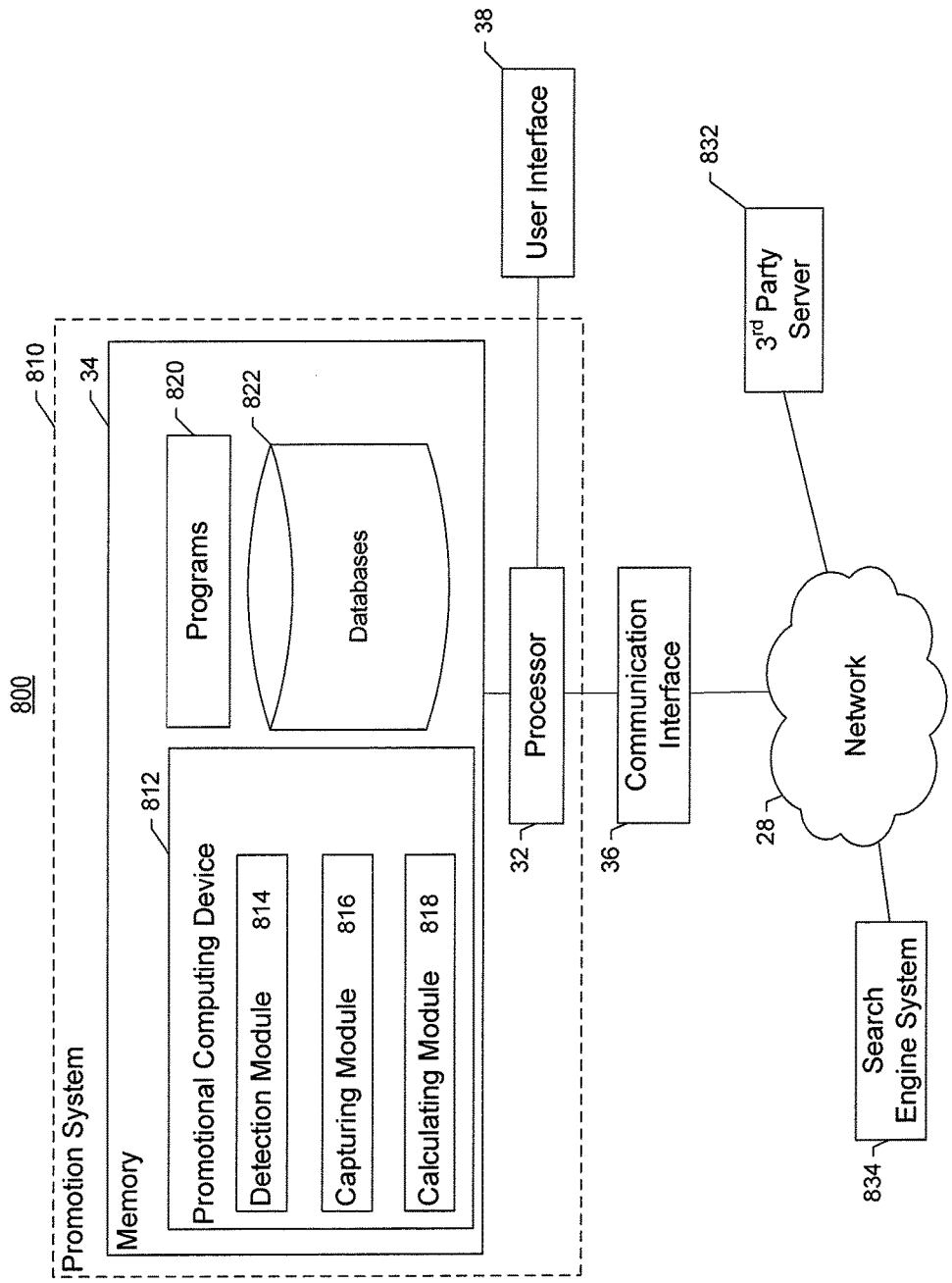
FIG. 8 is block diagram of a system that may be specifically configured in accordance with an example embodiment of the present invention.

FIG. 8 illustrates an example network architecture for a system in accordance with some embodiments discussed herein. System 800 may include one or more devices and sub-systems that are configured to implement some of the example embodiments discussed herein. For example, system 800 may include promotion system 810, which may include, for example, a processor 32, memory 34, a communications interface 36, and a user interface 38. Memory 34 may include promotional computing device 312.

Promotion system 810 can be coupled to a search engine system 834, a $3^{rd}$ party server 832, via network 28. Promotion system 810 may additionally be coupled to one or more consumer devices and/or one or more provider devices via network 28

In this regard, network 28 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 28 may include a cellular telephone, an 802.11, 802.16, 802.20, and/or WiMax network. Further, the network 28 may include a public network, such as the Internet, a private network, such as an intranet, or combinations thereof, and may utilize a variety of networking protocols now available or later developed including, but not limited to TCP/IP based networking protocols. In one embodiment, promotion system 810 can be coupled to any consumer and/or provider devices directly via any wired or wireless communication network including, for example, a wired or wireless local area network (LAN), personal area network (PAN), metropolitan area network (MAN), wide area network (WAN), or the like, as well as any hardware, software and/or firmware required to implement it.

Consumer devices and/or provider devices may each be implemented as a personal computer and/or other networked device, such as a cellular phone, a "smartphone", a tablet computer, mobile device, etc., that may be used for any suitable purpose in addition to buying or selling offers.

Memory 34 of promotion system 810 may include promotional computing device 812, and/or other programs 820 and data repositories 822. Promotional computing device 812 can be any suitable network server and/or other type of processing device. The programs 820 and data repositories 822 may be any suitable network database configured to store offer parameter data, consumer account information, merchant account information and/or analytics data, such as that discussed herein. In this regard, promotion system 810 may include, for example, at least one backend data server, network database, cloud computing device, among other things.

Regarding promotion system 810, FIG. 8 shows a schematic block diagram of circuitry, some or all of which may be included. As illustrated in FIG. 8, in accordance with some example embodiments, the circuitry can includes various means, such as processor 32, memory 34, communications interface 36, and/or user interface 38. As referred to herein, "module" includes hardware, software and/or firmware configured to perform one or more particular functions. In this regard, the means of the merchant device's circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 34) that is executable by a suitably configured processing device (e.g., processor 32), or some combination thereof.

In addition, promotion system 810 may comprise one or more distinct computing systems/devices and may span distributed locations. In other example embodiments, a pre-processing module or other module that requires heavy computational load may be configured to perform that computational load and thus may be on a remote device or server. Furthermore, each block shown may represent one or more such blocks as appropriate to a specific example embodiment. In some cases one or more of the blocks may be combined with other blocks.

Processor 32 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 3 as a single processor, in some embodiments, processor 32 comprises a plurality of processors. The plurality of processors may be embodied on a single computing device or may be distributed across a plurality of computing devices collectively. The plurality of processors may be in operative communication with each other and may be collectively configured to perform one or more functionalities of promotion system 810 as described herein. In an example embodiment, processor 32 is configured to execute instructions stored in memory 34 or otherwise accessible to processor 32. These instructions, when executed by processor 32, may cause promotion system 810 to perform one or more of the functionalities as described herein.

Whether configured by hardware, firmware/software methods, or by a combination thereof, processor 32 may comprise an entity capable of performing operations according to embodiments of the present invention while configured accordingly. Thus, for example, when processor 32 is embodied as an ASIC, FPGA or the like, processor 32 may comprise specifically configured hardware for conducting one or more operations described herein. Alternatively, as another example, when processor 32 is embodied as an executor of instructions, such as may be stored in memory 34, the instructions may specifically configure processor 32 to perform one or more algorithms and operations described herein, such as those discussed in connection with FIGS. 1, 4, 5, 6, and 7.

Memory 34 may comprise, for example, volatile memory, non-volatile memory, or some combination thereof. Although illustrated in FIG. 3 as a single memory, memory 34 may comprise a plurality of memory components. The plurality of memory components may be embodied on a single computing device or distributed across a plurality of computing devices. In various embodiments, memory 34 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 34 may be configured to store information, data (including offer parameter data, consumer data, inventory data and/or analytics data), applications, instructions, or the like for enabling promotion system 810 to carry out various functions in accordance with example embodiments of the present invention. For example, in at least some embodiments, memory 34 is configured to buffer input data for processing by processor 32. Alternatively or additionally, in at least some embodiments, memory 34 is configured to store program instructions for execution by processor 32. Memory 34 may store information in the form of static and/or dynamic information.

Communications interface 36 may be embodied as any device or means embodied in circuitry, hardware, a computer program product comprising computer readable program instructions stored on a computer readable medium (e.g., memory 34) and executed by a processing device (e.g., processor 32), or a combination thereof that is configured to receive and/or transmit data from/to another device, such as, for example, a consumer device, a provider device and/or the like. In some embodiments, communications interface 36 (like other components discussed herein) can be at least partially embodied as or otherwise controlled by processor 32. In this regard, communications interface 36 may be in communication with processor 32, such as via a bus. Communications interface 36 may include, for example, an antenna, a transmitter, a receiver, a transceiver, network interface card and/or supporting hardware and/or firmware/software for enabling communications with another computing device. Communications interface 36 may be configured to receive and/or transmit any data that may be stored by memory 34 using any protocol that may be used for communications between computing devices. Communications interface 36 may, alternatively or additionally, be in communication with the memory 34, user interface 38 and/or any other component of promotion system 810, such as via a bus.

User interface 38 may be in communication with processor 302 to receive an indication of a user input and/or to provide an audible, visual, mechanical, or other output to a user (e.g., merchant and/or consumer). As such, user interface 38 may include support, for example, for a keyboard, a mouse, a joystick, a display, a touch screen display, a microphone, a speaker, a RFID reader, credit card reader, barcode reader, biometric scanner, and/or other input/output mechanisms as represented by 308. User interface 38 may be in communication with the memory 34, communications interface 306, and/or any other component(s), such as via a bus. Although more than one input/output module and/or other component can be included in promotion system 810, only one is shown in FIG. 8 to avoid overcomplicating the drawing (like the other components discussed herein).

FIG. 8 also shows an example circuitry that may be included in promotional computing device 812, which may be configured to perform the detection, capturing, analysis, calculation, management and/or other functionality discussed in connection with promotion system 810. In this manner, from the merchant's perspective, promotional computing device 812 may provide cloud computing functionality and services to the provider. As illustrated in FIG. 8 and in accordance with some example embodiments, promotional computing device 812 can includes various means, such as detection module 814, capturing module 816 and/or calculating module 818.

Detection module 814 may be included and configured to perform the functionality discussed herein related to accessing a network or the world wide web (WWW) and/or detecting a presence of information related to a provider on a network or WWW. In some embodiments, some or all of the functionality of detection module 814 may be performed by processor 32. In this regard, the example processes and algorithms discussed herein can be performed by at least one processor 32 and/or detection module 814. For example, non-transitory computer readable media can be configured to store firmware, one or more application programs, and/or other software, which include instructions and other computer-readable program code portions that can be executed to control each processor (e.g., processor 32 and/or detection module 814) of the components of promotional computing device 810 to implement various operations, including the examples shown above. As such, a series of computer-readable program code portions are embodied in one or more computer program products and can be used, with a computing device, server, and/or other programmable apparatus, to produce machine-implemented processes.

Capturing module 816 can be configured to capturing review information from a network, the WWW, and/or a database. In order to capture review information, capturing module 816 may be configured to determine locations and/or formats of review information.

Calculating module 818 may be configured to assign, calculate or determine a provider quality score. Alternatively or additionally, calculating module 818 can be configured to calculate a review score from a plurality of different formats and/or sources to be utilized in the assignment, calculation and/or determination of the provider quality score. Furthermore, the Calculating module 818 can be configured to convert, trim and/or selectively utilize review information and/or review scores.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for identifying one or more supply sources as able to supply at least a portion of a residual demand in a particular geographic region for the at least one of one or more virtual offers, the one or more supply sources not currently engaged in offering any portion of the total demand, by calculating a provider quality score for each of the one or more supply sources, the provider quality score being a predictive value that is indicative of how well a potential supply source tasked with supplying a good or service determined to be in demand would perform during a promotion offered by a promotion and marketing service and how well consumers would react to the promotion, the method comprising:
   receiving information indicative of the residual demand for a particular good or service;
   identifying the one or more supply sources that are able to supply at least a portion of the residual demand in the particular geographic region;
   for each of the one or more supply sources:
      capturing, via a web data capturing algorithm, from one or more third-party websites, one or more metrics relating to a provider, wherein the one or more metrics are indicative of a third party evaluation of at least one of a product, service or experience provided by the provider, a performance of a provider, or the provider itself;
      capturing, via the web data capturing algorithm, from the one or more third-party websites, a number indicative of a quantity of the one or more captured metrics;
      calculating, via one or more processors, a provider quality score based on the one or more metrics and the number indicative of the quantity of the one or more captured metrics, wherein the provider score provides an indication of future provider performance and future third party reaction to the provider, wherein the calculation of the provider quality score comprises:
         aggregating ranking-type review information, like-type review information, and star-type review information, and category-specific type information,
         wherein the aggregating of the ranking-type review information, like-type review information, and star-type review information, and category-specific type information comprises:
            converting ranking-type review information into provider quality score type information;
            converting like-type review information into provider quality score type information by determining that providers with review information indicating that 0%-20% liked it, a 1.0; 21%-40% liked it, a 2.0; 41%-60 liked it, a 3.0, 61%-80% liked it, a 4.0, and 81%-100% liked it, a 5.0; and
            converting category-specific type information into provider quality score type information by calculating a weighted average of any two or more categories, the calculation being dependent on a category, sub-category, location, hyper-location, or price of the product, service or experience the provider is expected to provide;
   assigning one of a first subset of provider quality scores upon a determination that an average review score of the one or more metrics meets a first review threshold and the number indicative of the quantity of the one more captured metrics meets a first quantity threshold such that a merchant assigned one of the first subset of provider quality scores comprise both the average review score that meets the first review threshold and the quantity the one more captured metrics that meets the first quantity threshold;
   assigning one of a second subset of provider quality scores upon a determination that the average review score of the one or more metrics meets the first review threshold and the number indicative of the quantity of the one more captured metrics fails to meet the first quantity threshold such that a merchant assigned one of the second subset of provider quality scores comprise both the average review score that meets the first review threshold and a quantity the one more captured metrics that fails to meet the first quantity threshold;
   assigning one of a third subset of provider quality scores upon a determination that the average review score of the one or more metrics fails to meet the first review threshold and the number indicative of the quantity of the one more captured metrics fails to meet the first quantity threshold such that a merchant assigned one of the third subset of provider quality scores comprise both an average review score that fails to meet the first review threshold and a quantity the one more captured metrics that fails to meet the first quantity threshold;
   upon a determination that one of the first subset of provider quality scores is assigned, assigning a higher of two provider scores from the first subset of provider quality scores by:
      capturing, via the web data capturing algorithm, from the one or more third-party websites, a press review, the press review comprising text data; and
      determining, upon capture of the press review, that the text data comprises predefined text data; and generating a ranking of the one or more supply sources associated with provider quality scores that meet a predetermined threshold;

generating a list, utilizing the portion of the residual demand in the particular geographic region that each of the one or more supply sources associated with provider quality scores that meet a predetermined threshold is able to provide, the list comprising (i) in accordance with the ranking, one or more supply sources associated with provider quality scores that meet a predetermined threshold; and (ii) a quantity of the portion that each of the one or more supply sources is able to provide; and providing, via a communications module, to an assignment module configured to facilitate contact with a portion of the one or more supply sources, the list comprised of the one or more supply sources associated with provider quality scores that meet a predetermined threshold and the quantity of the portion that each of the one or more supply sources is able to provide.

2. A method according to claim 1, wherein the metrics are review information, the method further comprising:

calculating an average review score based on the one or more metrics and the number indicative of a quantity of metrics.

3. A method according to claim 1, further comprising:
detecting one or more web sources related to provider information; and
determining whether the one or more web sources provide metrics related to the provider.

4. A method according to claim 1, further comprising:
detecting a provider website;
rating a quality of the provider website; and
factoring the quality of the provider website into the provider quality score calculation.

5. A method according to claim 1, further comprising:
accessing prior performance data,
wherein prior performance data comprises one or more of data related to a previous provider promotion, data related to a previous promotion promoted by a related provider, or data related to a previous promotion promoted by a different promotion service by the provider; and
factoring the prior performance data into the provider quality score calculation.

6. A method according to claim 1, further comprising:
capturing positive press review information related to a provider;
determining if the positive press review information is from an acceptable source; and
factoring the positive press review information into the provider quality score calculation.

7. A method according to claim 1, further comprising:
capturing a number of "likes" related to a provider from one or more web sources; and
factoring in the number of "likes" into the provider quality score application.

8. An apparatus for identifying one or more supply sources as able to supply at least a portion of a residual demand in a particular geographic region for the at least one of one or more virtual offers, the one or more supply sources not currently engaged in offering any portion of the total demand, by calculating a provider quality score for each of the one or more supply sources, the provider quality score being a predictive value that is indicative of how well the potential supply source tasked with supplying a good or service determined to be in demand would perform during a promotion offered by a promotion and marketing service and how well consumers would react to the promotion, the apparatus comprising at least one processor and at least one memory including computer program code, the at least one memory and the computer program code configured to, with the at least one processor, cause the apparatus at least to:

receive information indicative of the residual demand for a particular good or service;

identify the one or more supply sources that are able to supply at least a portion of the residual demand in the particular geographic region;

for each of the one or more supply sources:

capture, via a web data capturing algorithm, from one or more third-party websites, one or more metrics relating to a provider, wherein the one or more metrics are indicative of a third party evaluation of at least one of a product, service or experience provided by the provider, a performance of a provider, or the provider itself;

capture, via the web data capturing algorithm, from the one or more third-party websites, a number indicative of a quantity of the one or more captured metrics; and calculate, via one or more processors, a provider quality score based on the one or more metrics and the number indicative of a quantity of the one or more captured metrics, wherein the provider score provides an indication of future provider performance and future third party reaction to the provider, wherein the calculation of the provider quality score comprises:

aggregating ranking-type review information, like-type review information, and star-type review information, and category-specific type information, wherein the aggregating of the ranking-type review information, like-type review information, and star-type review information, and category-specific type information comprises:

converting ranking-type review information into provider quality score type information;

converting like-type review information into provider quality score type information by determining that providers with review information indicating that 0%-20% liked it, a 1.0; 21%-40% liked it, a 2.0; 41%-60 liked it, a 3.0, 61%-80% liked it, a 4.0, and 81%-100% liked it, a 5.0; and converting category-specific type information into provider quality score type information by calculating a weighted average of any two or more categories, the calculation being dependent on a category, sub-category, location, hyper-location, or price of the product, service or experience the provider is expected to provide;

assigning one of a first subset of provider quality scores upon a determination that an average review score of the one or more metrics meets a first review threshold and the number indicative of the quantity of the one more captured metrics meets a first quantity threshold such that a merchant assigned one of the first subset of provider quality scores comprise both the average review score that meets the first review threshold and the quantity the one more captured metrics that meets the first quantity threshold;

assigning one of a second subset of provider quality scores upon a determination that the average review score of the one or more metrics meets the first review threshold and the number indicative of the quantity of the one more captured metrics fails to meet the first quantity threshold such that a merchant assigned one of the second subset of provider quality scores comprise both the average review score that meets the first review threshold and a quantity the one more captured metrics that fails to meet the first quantity threshold;

assigning one of a third subset of provider quality scores upon a determination that the average review score of the one or more metrics fails to meet the first review threshold and the number indicative of the quantity of the one more captured metrics fails to meet the first quantity threshold such that a merchant assigned one of the third subset of provider quality scores comprise both an average review score that fails to meet the first review threshold and a quantity the one more captured metrics that fails to meet the first quantity threshold;

upon a determination that one of the first subset of provider quality scores is assigned, assigning a higher of two provider scores from the first subset of provider quality scores by:
  capturing, via the web data capturing algorithm, from the one or more third-party websites, a press review, the press review comprising text data; and
  determining, upon capture of the press review, that the text data comprises predefined text data; and generating a ranking of the one or more supply sources associated with provider quality scores that meet a predetermined threshold;

generate a list, utilizing the portion of the residual demand in the particular geographic region that each of the one or more supply sources associated with provider quality scores that meet a predetermined threshold is able to provide, the list comprising (i) in accordance with the ranking, one or more supply sources associated with provider quality scores that meet a predetermined threshold; and (ii) a quantity of the portion that each of the one or more supply sources is able to provide; and provide, via a communications module, to an assignment module configured to facilitate contact with a portion of the one or more supply sources, the list comprised of the one or more supply sources associated with provider quality scores that meet a predetermined threshold and the quantity of the portion that each of the one or more supply sources is able to provide.

9. The apparatus of claim 8, wherein the metrics are review information, wherein the at least one memory and computer program code are configured to, with the at least one processor, cause the apparatus to:
  calculate an average review score based on the one or more metrics and the number indicative of a quantity of metrics.

10. The apparatus of claim 8, wherein the at least one memory and computer program code are configured to, with the at least one processor, cause the apparatus to:
  detect one or more web sources related to provider information; and
  determine whether the one or more web sources provide metrics related to the provider.

11. The apparatus of claim 8, wherein the at least one memory and computer program code are configured to, with the at least one processor, cause the apparatus to:
  detect a provider website;
  rate a quality of the provider website; and
  factor the quality of the provider website into the provider quality score calculation.

12. The apparatus of claim 8, wherein the at least one memory and computer program code are configured to, with the at least one processor, cause the apparatus to:
  access prior performance data,
  wherein prior performance data comprises one or more of data related to a previous provider promotion, data related to a previous promotion promoted by a related provider, or data related to a previous promotion promoted by a different promotion service by the provider; and
  factor the prior performance data into the provider quality score calculation.

13. The apparatus of claim 8, wherein the at least one memory and computer program code are configured to, with the at least one processor, cause the apparatus to:
  capture positive press review information related to a provider;
  determine if the positive press review information is from an acceptable source; and
  factor the positive press review information into the provider quality score calculation.

14. The apparatus of claim 8, wherein the at least one memory and computer program code are configured to, with the at least one processor, cause the apparatus to:
  capture a number of "likes" related to a provider from one or more web sources; and
  factor in the number of "likes" into the provider quality score application.

15. The apparatus of claim 8 wherein the at least one memory and computer program code are configured to, with the at least one processor, cause the apparatus to:
  in an instance in which the average review score is greater than a first predetermined threshold, and the number of reviews is greater than a second predetermined threshold, perform a first quality analysis.

16. The apparatus of claim 15, wherein the at least one memory and computer program code are configured to, with the at least one processor, cause the apparatus to:
  in an instance in which the average review score is less than the first predetermined threshold, or the number of reviews is less than the second predetermined threshold, perform a second quality analysis.

17. The apparatus of claim 16, wherein the second quality analysis comprises:
  in an instance in which the average review score is less than an eighth predetermined threshold or in an instance in which the number of reviews is less than a tenth predetermined threshold, assigning a tenth provider quality score.

18. The apparatus of claim 16, wherein in an instance in which the average review score is greater than an eighth predetermined threshold and in an instance in which the number of reviews is greater than a tenth predetermined threshold, the at least one memory and computer program code are configured to, with the at least one processor, cause the apparatus to perform a fifth quality analysis.

19. The apparatus of claim 18, wherein the fifth quality analysis comprises:
  in an instance in which the average review score is less than a ninth predetermined threshold, assigning an ninth provider quality score.

20. The apparatus of claim 18, wherein the fifth quality analysis comprises:
  in an instance in which the average review score is greater than a ninth predetermined threshold, performing a sixth quality analysis.

21. The apparatus of claim 20, wherein the sixth quality analysis comprises:
  capturing a number of "likes" from one or more web sources; and
  determining whether the provider is associated with a positive press review from one or more web sources.

22. The apparatus of claim 21, wherein, in an instance in which the provider is not associated with a positive press review or in an instance in which the number of likes is less than an eleventh predetermined threshold, the at least one memory and computer program code are configured to, with the at least one processor, cause the apparatus to assign an eighth provider quality score.

23. The apparatus of claim 21, wherein, in an instance in which the provider is associated with a positive press review, and in an instance in which the number of likes is greater than an eleventh predetermined threshold, wherein the at least one memory and computer program code are configured to, with the at least one processor, cause the apparatus to perform a seventh quality analysis.

24. The apparatus of claim 23, wherein the seventh quality analysis comprises:
  in an instance in which the average review score is greater than a twelfth predetermined threshold and in an instance in which the number of "likes" is greater than a thirteenth predetermined threshold, assigning a sixth provider quality score.

25. The apparatus of claim 23, wherein the seventh quality analysis comprises:
  in an instance in which the average review score is less than a twelfth predetermined threshold or in an instance in which the number of "likes" is less than a thirteenth predetermined threshold, assigning a seventh provider quality score.

26. The apparatus of claim 15, wherein the first quality analysis comprises:
  in an instance in which the average review score is greater than a third predetermined threshold and in an instance in which the number of reviews is greater than a fourth predetermined threshold, performing a third quality analysis.

27. The apparatus of claim 26, wherein the third quality analysis comprises:
  determining whether the provider is associated with a positive press review;
  in an instance in which the provider is associated with a positive press review, assigning a first provider quality score.

28. The apparatus of claim 26, wherein the third quality analysis comprises:
  determining whether the provider is associated with a positive press review;
  in an instance in which the provider is not associated with a positive press review, assigning a second provider quality score.

29. The apparatus of claim 15, wherein the first quality analysis comprises:
  in an instance in which the average review score is less than a third predetermined threshold or in an instance in which the number of reviews is less than a fourth predetermined threshold, performing a fourth quality analysis.

30. The apparatus of claim 29, wherein the fourth quality analysis comprises:
  in an instance in which the average review score is at least than a fifth predetermined threshold and in an instance in which the number of reviews is at least a sixth predetermined threshold, assigning a third provider quality score.

31. The apparatus of claim 30, wherein in an instance in which the average review score is less than the fifth predetermined threshold or in an instance in which the number of reviews is less than a sixth predetermined threshold, the at least one memory and computer program code are configured to, with the at least one processor, cause the apparatus to determine a number of "likes".

32. The apparatus of claim 31, wherein in an instance in which the average review score is at least the fifth predetermined threshold and in an instance in which the number of "likes" is at least a seventh predetermined threshold, the at least one memory and computer program code are configured to, with the at least one processor, cause the apparatus to assign a fourth provider quality score.

33. The apparatus of claim 32, wherein in an instance in which the average review score is less than the fifth predetermined threshold or in an instance in which the number of "likes" is less than the seventh predetermined threshold, the at least one memory and computer program code are configured to, with the at least one processor, cause the apparatus to assign a fifth provider quality score.

34. The apparatus of claim 15 wherein the at least one memory and computer program code are configured to, with the at least one processor, cause the apparatus to determine whether a provider is associated with an online presence, and in an instance where the provider is not associated with an online presence, assigning a minimum provider quality score.

35. A computer program product for identifying one or more supply sources as able to supply at least a portion of a residual demand in a particular geographic region for the at least one of one or more virtual offers, the one or more supply sources not currently engaged in offering any portion of the total demand, by calculating a provider quality score for each of the one or more supply sources, the provider quality score being a predictive value that is indicative of how well the potential supply source tasked with supplying a good or service determined to be in demand would perform during a promotion offered by a promotion and marketing service and how well consumers would react to the promotion, the computer program product comprising at least one computer-readable storage medium having computer-executable program code instructions stored therein, the computer-executable program code instructions comprising program code instructions for:
  receiving information indicative of the residual demand for a particular good or service;
  identifying the one or more supply sources that are able to supply at least a portion of the residual demand in the particular geographic region;
  for each of the one or more supply sources:
  capturing, via a web data capturing algorithm, from one or more third-party websites, one or more metrics relating to a provider, wherein the one or more metrics are indicative of a third parties evaluation of at least one of a product, service or experience provided by the provider, a performance of a provider, or the provider itself;
  capturing, via the web data capturing algorithm, from the one or more third-party websites, a number indicative of a quantity of the one or more captured metrics; and
  calculating, via one or more processors, a provider quality score based on the one or more metrics and the number indicative of a quantity of the one or more captured metrics, wherein the provider score provides an indication of future provider performance and future third party reaction to the provider, wherein the calculation of the provider quality score comprises:

aggregating ranking-type review information, like-type review information, and star-type review information, and category-specific type information, wherein the aggregating of the ranking-type review information, like-type review information, and star-type review information, and category-specific type information comprises:

converting ranking-type review information into provider quality score type information;

converting like-type review information into provider quality score type information by determining that providers with review information indicating that 0%-20% liked it, a 1.0; 21%-40% liked it, a 2.0; 41%-60 liked it, a 3.0, 61%-80% liked it, a 4.0, and 81%-100% liked it, a 5.0; and converting category-specific type information into provider quality score type information by calculating a weighted average of any two or more categories, the calculation being dependent on a category, sub-category, location, hyper-location, or price of the product, service or experience the provider is expected to provide;

assigning one of a first subset of provider quality scores upon a determination that an average review score of the one or more metrics meets a first review threshold and the number indicative of the quantity of the one more captured metrics meets a first quantity threshold such that a merchant assigned one of the first subset of provider quality scores comprise both the average review score that meets the first review threshold and the quantity the one more captured metrics that meets the first quantity threshold;

assigning one of a second subset of provider quality scores upon a determination that the average review score of the one or more metrics meets the first review threshold and the number indicative of the quantity of the one more captured metrics fails to meet the first quantity threshold such that a merchant assigned one of the second subset of provider quality scores comprise both the average review score that meets the first review threshold and a quantity the one more captured metrics that fails to meet the first quantity threshold;

assigning one of a third subset of provider quality scores upon a determination that the average review score of the one or more metrics fails to meet the first review threshold and the number indicative of the quantity of the one more captured metrics fails to meet the first quantity threshold such that a merchant assigned one of the third subset of provider quality scores comprise both an average review score that fails to meet the first review threshold and a quantity the one more captured metrics that fails to meet the first quantity threshold;

upon a determination that one of the first subset of provider quality scores is assigned, assigning a higher of two provider scores from the first subset of provider quality scores by:

capturing, via the web data capturing algorithm, from the one or more third-party websites, a press review, the press review comprising text data; and determining, upon capture of the press review, that the text data comprises predefined text data; and generating a ranking of the one or more supply sources associated with provider quality scores that meet a predetermined threshold; and generating a list, utilizing the portion of the residual demand in the particular geographic region that each of the one or more supply sources associated with provider quality scores that meet a predetermined threshold is able to provide, the list comprising (i) in accordance with the ranking, one or more supply sources associated with provider quality scores that meet a predetermined threshold; and (ii) a quantity of the portion that each of the one or more supply sources is able to provide; and providing, via a communications module, to an assignment module configured to facilitate contact with a portion of the one or more supply sources, the list comprised of the one or more supply sources associated with provider quality scores that meet a predetermined threshold and the quantity of the portion that each of the one or more supply sources is able to provide.

* * * * *